United States Patent
Oda et al.

(10) Patent No.: US 9,906,296 B2
(45) Date of Patent: Feb. 27, 2018

(54) NETWORK CONTROLLER AND SIGNAL QUALITY ESTIMATING METHOD

(71) Applicant: FUJITSU LIMITED, Kawasaki-shi, Kanagawa (JP)

(72) Inventors: Shoichiro Oda, Fuchu (JP); Yasuhiko Aoki, Yokohama (JP); Takeshi Hoshida, Kawasaki (JP); Hisao Nakashima, Kawasaki (JP); Hiroki Oi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/172,312

(22) Filed: Jun. 3, 2016

(65) Prior Publication Data

US 2016/0373187 A1 Dec. 22, 2016

(30) Foreign Application Priority Data

Jun. 22, 2015 (JP) ................... 2015-125177

(51) Int. Cl.
*H04B 10/079* (2013.01)
*H04B 10/00* (2013.01)
*H04J 14/02* (2006.01)

(52) U.S. Cl.
CPC ... *H04B 10/07953* (2013.01); *H04B 10/0793* (2013.01); *H04J 14/0256* (2013.01)

(58) Field of Classification Search
None
See application file for complete search history.

(56) References Cited

U.S. PATENT DOCUMENTS

| 9,215,029 B2 * | 12/2015 | Han | H04J 14/0221 |
| 9,225,430 B2 | 12/2015 | Harley et al. | |
| 2005/0175340 A1 * | 8/2005 | Penninckx | H04J 14/0227 398/27 |
| 2006/0002716 A1 * | 1/2006 | Guy | H04J 14/0227 398/175 |
| 2009/0269057 A1 * | 10/2009 | Tanaka | H04Q 11/0062 398/34 |

(Continued)

FOREIGN PATENT DOCUMENTS

JP 2009-118090 5/2009

OTHER PUBLICATIONS

Sambo ["Lightpath Establishment Assisted by Offline QoT Estimation in Transparent Optical Networks" J. Opt. Commun. Netw. /vol. 2, No. 11/Nov. 2010].*

(Continued)

*Primary Examiner* — Oommen Jacob
(74) *Attorney, Agent, or Firm* — Staas & Halsey LLP

(57) ABSTRACT

A network controller includes: a first acquisition unit configured to acquire, based on a signal quality amount of each of wavelength paths set in a network of an optical wavelength-multiplexed transmission system, a signal quality amount of each of spans in each of the wavelength paths; an arithmetic unit configured to calculate a signal quality amount of each of spans in a wavelength path of an estimation target, based on the signal quality amount acquired by the first acquisition unit; and an estimation unit configured to estimate a signal quality amount of the wavelength path of the estimation target, based on the signal quality amount calculated by the arithmetic unit.

10 Claims, 38 Drawing Sheets

(56) References Cited

U.S. PATENT DOCUMENTS

| | | | |
|---|---|---|---|
| 2011/0229122 A1* | 9/2011 | Castoldi | H04J 14/0227 398/2 |
| 2012/0148234 A1* | 6/2012 | Bellagamba | H04J 14/0221 398/28 |
| 2014/0023372 A1* | 1/2014 | Sambo | H04J 14/0224 398/79 |
| 2014/0099119 A1* | 4/2014 | Wei | H04J 14/0257 398/79 |
| 2014/0112655 A1* | 4/2014 | Huang | H04J 14/0291 398/14 |
| 2014/0334815 A1* | 11/2014 | Grellier | H04J 14/0227 398/27 |
| 2016/0373187 A1* | 12/2016 | Oda | H04B 10/07953 |

OTHER PUBLICATIONS

Castoldi ["QoT-aware lightpath set-up in GMPLS-controlled WDM networks:A survey" Optical Switching and Networking 8(2011)275-284].*

Talabuttula ["Quality of Transmission (QoT)—Aware Routing in All-Optical WDM Networks", 2010 IEEE].*

Caballero, A. et al., "Experimental Demonstration of a Cognitive Quality of Transmission Estimator for Optical Communication Systems", *Optics Express*, vol. 20, No. 26, 2012, pp. B64-B70.

Sartzetakis, I. et al., "Estimating QoT of Unestablished Lightpaths", *Optical Fiber Communication Conference*, 2016, 3 pp.

* cited by examiner

FIG. 4

| PATH IDENTIFICATION INFORMATION | A-B | B-C | C-D | D-E | E-F | F-G | PATH OSNR | PATH BER |
|---|---|---|---|---|---|---|---|---|
| $\lambda_1$ | | | | ▨ | ▨ | ▨ | | 1.0E-06 |
| $\lambda_2$ | ▨ | | | | ▨ | ▨ | | 1.0E-04 |
| $\lambda_3$ | | | | | | | | |
| $\lambda_4$ | ▨ | ▨ | ▨ | | | | | 1.0E-05 |

| PATH IDENTIFICATION INFORMATION | PATH BER |
|---|---|
| $\lambda_1$ | 1.0E-06 |
| $\lambda_2$ | 1.0E-04 |
| $\lambda_3$ | |
| $\lambda_4$ | 1.0E-05 |

FIG.6

| PATH IDENTIFICATION INFORMATION | PATH BER | PATH OSNR[dB] |
|---|---|---|
| $\lambda_1$ | 10.E-06 | 17.62 |
| $\lambda_2$ | 10.E-04 | 15.49 |
| $\lambda_3$ | | |
| $\lambda_4$ | 1.0E-05 | 16.68 |

FIG. 8

| PATH IDENTIFICATION INFORMATION | A-B | B-C | C-D | D-E | E-F | F-G | PATH OSNR[dB] | PATH BER |
|---|---|---|---|---|---|---|---|---|
| λ₁ | 20.63 | 20.63 | | | | | 17.62 | 1.0E-06 |
| λ₂ | | 20.26 | 20.26 | 20.26 | | | 15.49 | 1.0E-04 |
| λ₃ | 20.63 | 19.92 | 20.26 | 20.82 | 21.45 | 21.45 | 12.94 | 2.79E-03 |
| λ₄ | | | | 21.45 | 21.45 | 21.45 | 16.68 | 1.0E-05 |

31, 32, 33, 34, 30

- ASSIGN SAME VALUE
- CALCULATE IN LINEAR EXTRAPOLATION
- ASSIGN SAME VALUE
- ASSIGN SAME VALUE
- CALCULATE IN LINEAR INTERPOLATION
- ESTIMATED BER

FIG.9

| PATH IDENTIFICATION INFORMATION | A-B | B-C | C-D | D-E | E-F | F-G | PATH OSNR[dB] | PATH BER |
|---|---|---|---|---|---|---|---|---|
| $\lambda_1$ | 20.63 | 20.63 | | | | | 17.62 | 1.0E-06 |
| $\lambda_2$ | | 20.26 | 20.26 | 20.26 | | | 15.49 | 1.0E-04 |
| $\lambda_3$ | 20.63 | 19.92 | 20.26 | 20.26 | 20.26 | 20.26 | 12.48 | 4.27E-03 |

- 31: PATH IDENTIFICATION INFORMATION
- 32: span columns
- 33: PATH OSNR[dB]
- 34: PATH BER
- 30: table ASSIGN SAME VALUE
CALCULATE IN LINEAR INTERPOLATION
ASSIGN SAME VALUE
AVERAGE OF OSNRS OF SPAN A-E

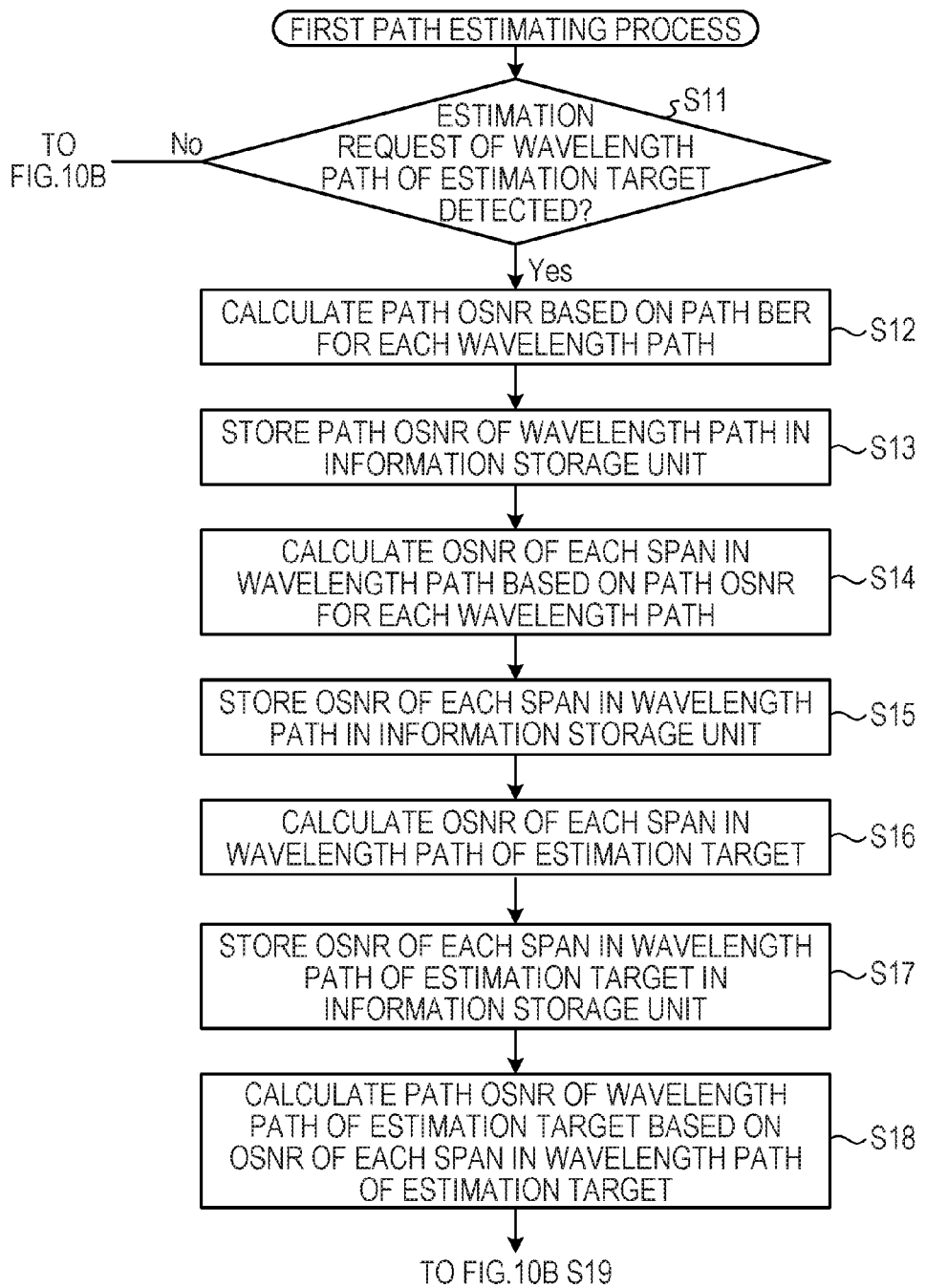

| BEFORE UPDATE 31 | A-B 32 | B-C 32 | C-D 32 | D-E 32 | E-F 32 | F-G 32 |
|---|---|---|---|---|---|---|
| PATH IDENTIFICATION INFORMATION | | | | | | |
| $\lambda_1$ | 20.63 | 20.63 | | | | |
| $\lambda_2$ | | 20.26 | 20.26 | 20.26 | | |
| $\lambda_3$ | 20.63 | 19.92 | 20.26 | 20.82 | 21.45 | 21.45 |
| $\lambda_4$ | | | | 21.45 | 21.45 | 21.45 |

| AFTER UPDATE 31 | A-B 32 | B-C 32 | C-D 32 | D-E 32 | E-F 32 | F-G 32 | PATH OSNR[dB] 33 | PATH BER 34 |
|---|---|---|---|---|---|---|---|---|
| PATH IDENTIFICATION INFORMATION | | | | | | | | |
| $\lambda_1$ | 20.63 | 20.63 | | | | | 17.62 | 1.0E-06 |
| $\lambda_2$ | | 20.26 | 20.26 | 20.26 | | | 15.49 | 1.0E-04 |
| $\lambda_3$ | 21.56 | 20.69 | 21.10 | 21.79 | 22.60 | 22.60 | 13.88 | 1.0E-03 |
| $\lambda_4$ | | | | 21.45 | 21.45 | 21.45 | 16.68 | 1.0E-05 |

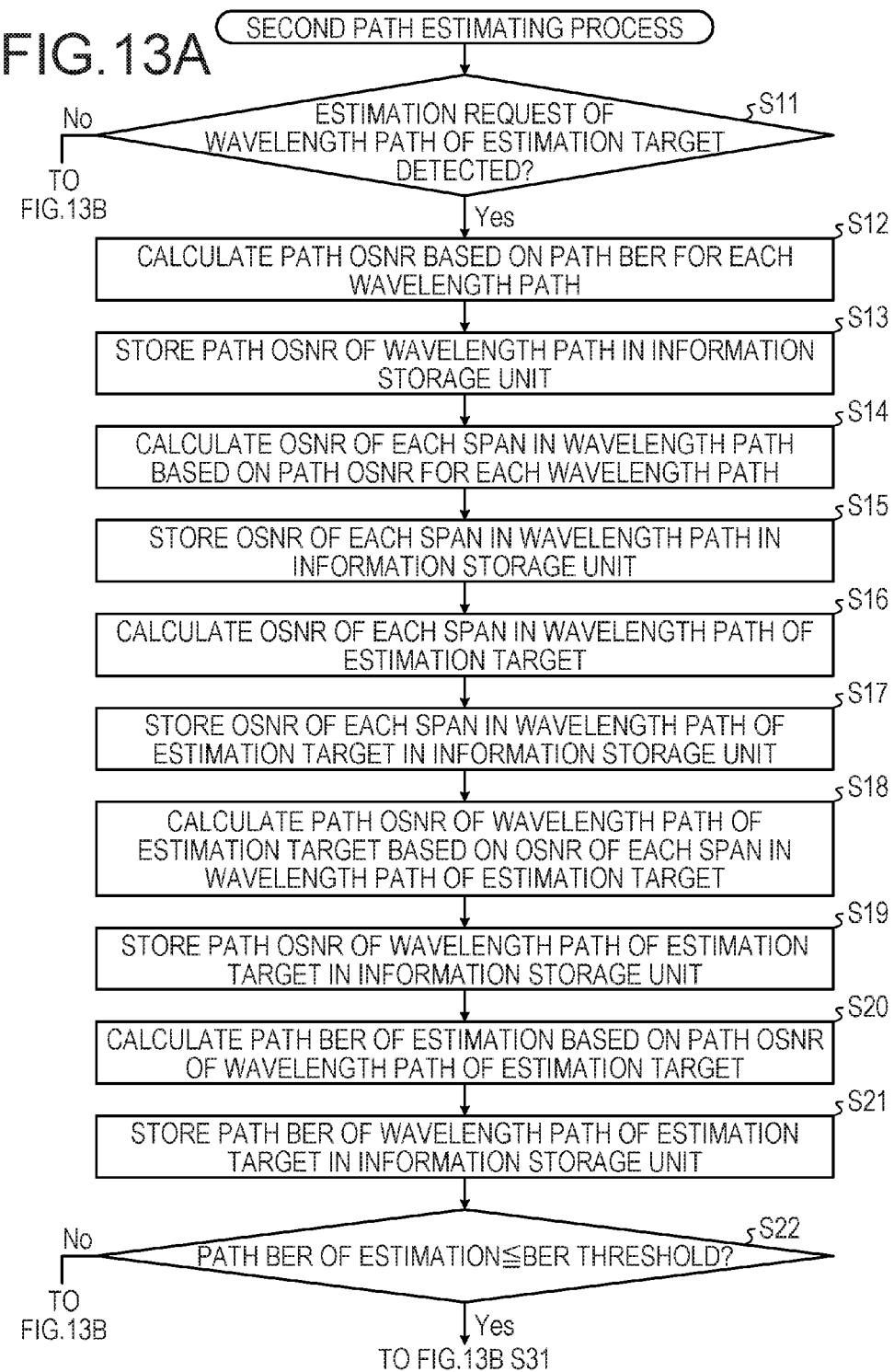

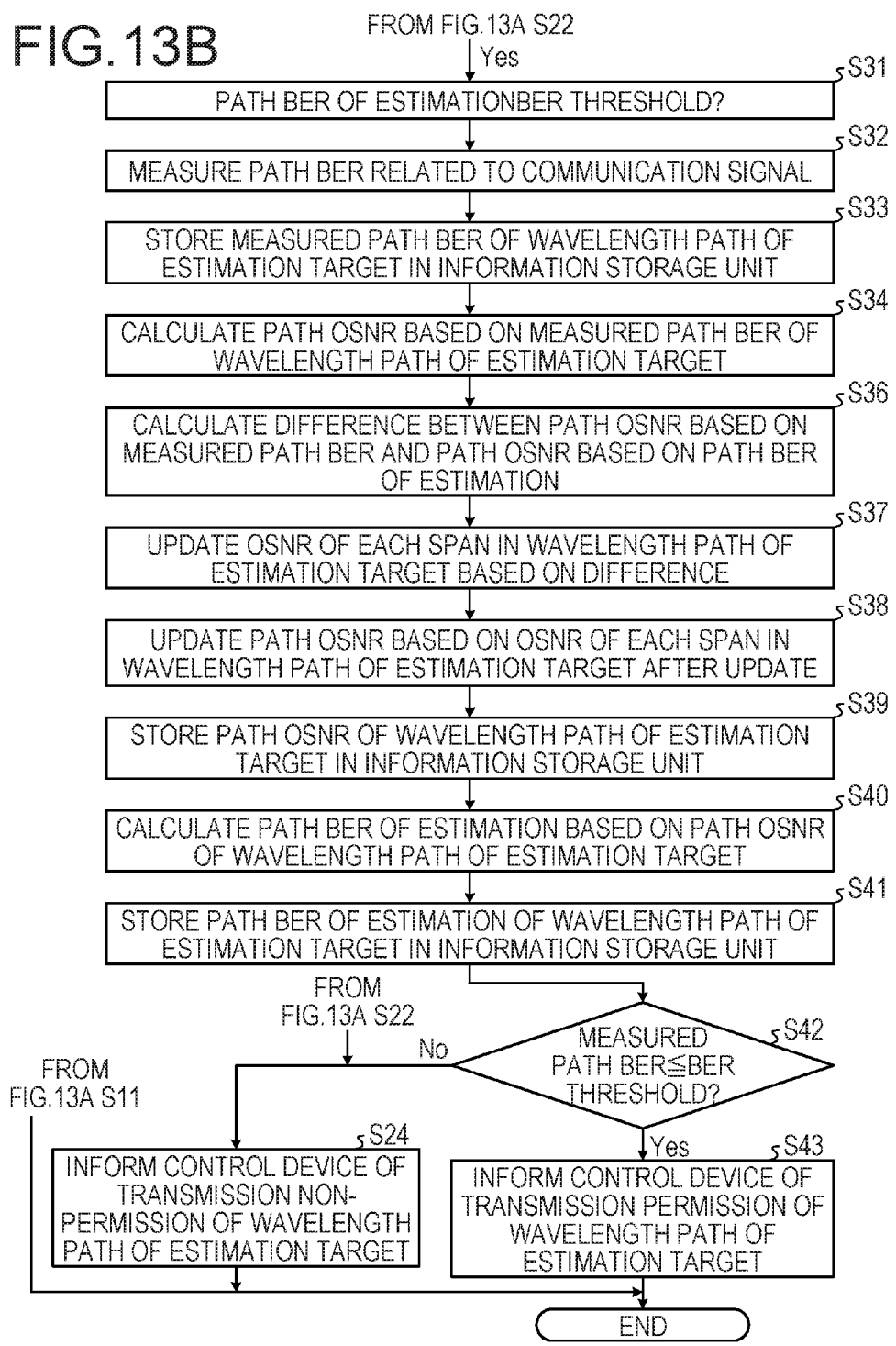

FIG. 14

| PATH IDENTIFICATION INFORMATION | A-B | B-C | C-D | D-E | E-F | F-G | PATH OSNR[dB] | PATH BER |
|---|---|---|---|---|---|---|---|---|
| $\lambda_1$ | 21.60 | 19.84 | | | | | 17.62 | 1.0E-06 |
| $\lambda_2$ | | 21.51 | 20.26 | 19.29 | | | 15.49 | 1.0E-04 |
| $\lambda_3$ | 21.60 | 20.60 | 20.26 | 19.49 | 23.67 | 21.91 | 13.28 | 1.98E-03 |
| $\lambda_4$ | | | | 19.69 | 23.67 | 21.91 | 16.68 | 1.0E-05 |

31, 32, 33, 34

ASSIGN SAME VALUE
CALCULATE AS AVERAGE
ASSIGN SAME VALUE
CALCULATE AS AVERAGE
ASSIGN SAME VALUE
ESTIMATED BER

FIG. 15

| PATH IDENTIFICATION INFORMATION (31) | A-B (32) | B-C (32) | C-D (32) | D-E (32) | E-F (32) | F-G (32) | PATH OSNR[dB] (33) | PATH BER (34) |
|---|---|---|---|---|---|---|---|---|
| λ₁ | 20.60 | 20.63 | | | | | 17.62 | 1.0E-06 |
| λ₂ | | 20.63 | 20.26 | 20.26 | | | 15.49 | 1.0E-04 |
| λ₃ | 19.63 | 18.92 | 19.26 | 19.82 | 20.45 | 20.45 | 11.94 | 6.75E-03 |
| λ₄ | | | | 21.45 | 21.45 | 21.45 | 16.68 | 1.0E-05 |

ASSIGN VALUE LOWERED BY 1 dB

CALCULATE FROM VALUE LOWERED BY 1 dB IN EXTRAPOLATION

ASSIGN VALUE LOWERED BY 1 dB

CALCULATE FROM VALUE LOWERED BY 1 dB IN INTERPOLATION

ASSIGN VALUE LOWERED BY 1 dB

ESTIMATED BER

FIG. 16

| PATH IDENTIFICATION INFORMATION | A-B | B-C | C-D | D-E | E-F | F-G | PATH OSNR[dB] | PATH BER |
|---|---|---|---|---|---|---|---|---|
| λ₁ | 20.63 | 20.63 | | | | | 17.62 | 1.0E-06 |
| λ₃ | 20.63 | 20.63 | 21.02 | 21.45 | 21.45 | 21.45 | 13.31 | 1.91E-03 |
| λ₄ | | | | 21.45 | 21.45 | 21.45 | 16.68 | 1.0E-05 |

31 — PATH IDENTIFICATION INFORMATION
32 — (segments A-B through F-G)
33 — PATH OSNR[dB]
34 — PATH BER

ASSIGN SAME VALUE
CALCULATE IN LINEAR INTERPOLATION
ASSIGN SAME VALUE

FIG. 17

| PATH IDENTIFICATION INFORMATION (31) | A-B (32) | B-C (32) | C-D (32) | D-E (32) | E-F (32) | F-G (32) | PATH OSNR[dB] (33) | PATH BER (34) |
|---|---|---|---|---|---|---|---|---|
| $\lambda_1$ | 21.60 | 19.84 | 20.26 | 19.29 | | | 17.62 | 1.0E-06 |
| $\lambda_2$ | | 21.51 | | | | | 15.49 | 1.0E-04 |
| $\lambda_3$ | | | | | | | | |
| $\lambda_4$ | | | | 19.69 | 23.67 | 21.91 | 16.68 | 1.0E-05 |
| SPAN DISTANCE | 40 | 60 | 80 | 100 | 40 | 60 | | |

| PATH IDENTIFICATION INFORMATION | A-B | B-C | C-D | D-E | E-F | F-G | PATH OSNR[dB] | PATH BER |
|---|---|---|---|---|---|---|---|---|
| λ₁ | 20.63 | 20.63 | | | | | 17.62 | 1.0E-06 |
| λ₂ | | 20.26 | 20.26 | 20.26 | | | 15.49 | 1.0E-04 |
| λ₃ | 20.00 | 20.00 | 20.00 | 20.00 | 20.00 | 20.00 | 12.22 | 5.36E-03 |
| λ₄ | | | | 21.45 | 21.45 | 21.45 | 16.68 | 1.0E-05 |

⇨

(B)

| PATH IDENTIFICATION INFORMATION | A-B | B-C | C-D | D-E | E-F | F-G | PATH OSNR[dB] | PATH BER |
|---|---|---|---|---|---|---|---|---|
| λ₁ | 20.63 | 20.63 | | | | | 17.62 | 1.0E-06 |
| λ₂ | | 20.26 | 20.26 | 20.26 | | | 15.49 | 1.0E-04 |
| λ₃ | 20.30 | 19.96 | 20.13 | 20.39 | 20.67 | 20.67 | 12.56 | 3.97E-03 |
| λ₄ | | | | 21.45 | 21.45 | 21.45 | 16.68 | 1.0E-05 |

FIG.19

BEFORE UPDATE

| PATH IDENTIFICATION INFORMATION (31) | A-B (32) | B-C (32) | C-D (32) | D-E (32) | E-F (32) | F-G (32) | PATH OSNR[dB] (33) | PATH BER (34) |
|---|---|---|---|---|---|---|---|---|
| λ₁ | 21.60 | 19.84 | | | | | 17.62 | 1.0E-06 |
| λ₂ | | 21.51 | 20.26 | 19.29 | | | 15.49 | 1.0E-04 |
| λ₃ | 21.60 | 20.60 | 20.26 | 19.49 | 23.67 | 21.91 | 13.28 | 1.98E-03 |
| λ₄ | | | | 19.69 | 23.67 | 21.91 | 16.68 | 1.0E-05 |

⇨

AFTER UPDATE

| PATH IDENTIFICATION INFORMATION (31) | A-B (32) | B-C (32) | C-D (32) | D-E (32) | E-F (32) | F-G (32) | PATH OSNR[dB] (33) | PATH BER (34) |
|---|---|---|---|---|---|---|---|---|
| λ₁ | 21.60 | 19.84 | | | | | 17.62 | 1.0E-06 |
| λ₂ | | 21.51 | 20.26 | 19.29 | | | 15.49 | 1.0E-04 |
| λ₃ | 22.03 | 21.11 | 20.90 | 20.16 | 24.38 | 22.62 | 13.88 | 1.0E-03 |
| λ₄ | | | | 19.69 | 23.67 | 21.91 | 16.68 | 1.0E-05 |
| SPAN DISTANCE | 40 | 60 | 80 | 100 | 40 | 60 | | |

| PATH IDENTIFICATION INFORMATION | A-B | B-C | C-D | D-E | E-F | F-G | PATH OSNR[dB] | PATH BER |
|---|---|---|---|---|---|---|---|---|
| λ₁ | 21.60 | 19.84 | | | | | 17.62 | 1.0E-06 |
| λ₂ | | 21.51 | 20.26 | 19.29 | | | 15.49 | 1.0E-04 |
| λ₃ | 22.03 | 21.11 | 20.90 | 20.16 | 24.38 | 22.62 | 13.88 | 1.0E-03 |
| λ₄ | | | | 19.69 | 23.67 | 21.91 | 16.68 | 1.0E-05 |
| SPAN DISTANCE | 40 | 60 | 80 | 100 | 40 | 60 | | |

⇒

(B)

| PATH IDENTIFICATION INFORMATION | A-B | B-C | C-D | D-E | E-F | F-G | PATH OSNR[dB] | PATH BER |
|---|---|---|---|---|---|---|---|---|
| λ₁ | 21.18 | 19.42 | | | | | 17.20 | 3.0E-06 |
| λ₂ | | 21.08 | 19.83 | 18.86 | | | 15.06 | 2.0E-04 |
| λ₃ | 22.03 | 21.11 | 20.90 | 20.16 | 24.38 | 22.62 | 13.88 | 1.0E-03 |
| λ₄ | | | | 19.01 | 22.99 | 21.23 | 16.00 | 4.0E-05 |
| SPAN DISTANCE | 40 | 60 | 80 | 100 | 40 | 60 | | |

CHANGE OF BER AFTER SIGNAL COMMUNICATION

| PATH IDENTIFICATION INFORMATION | ADDED NOISE AMOUNT[dB] | ALLOWABLE OSNR[dB] | PATH OSNR[dB] |
|---|---|---|---|
| $\lambda_1$ | 4.62 | 13.0 | 17.62 |
| $\lambda_2$ | 2.49 | 13.0 | 15.49 |
| $\lambda_3$ | | | |
| $\lambda_4$ | 3.68 | 13.0 | 16.68 |

| PATH IDENTIFICATION INFORMATION (31A) | A-B (32A) | B-C (32A) | C-D (32A) | D-E (32A) | E-F (32A) | F-G (32A) | ADDED NOISE AMOUNT[dB] (33A) | ALLOWABLE OSNR[dB] (33B) | PATH OSNR[dB] (34A) |
|---|---|---|---|---|---|---|---|---|---|
| $\lambda_1$ | 20.63 | 20.63 | | | | | 4.62 | 13.0 | 17.62 |
| $\lambda_2$ | | 20.26 | 20.26 | 20.26 | | | 2.49 | 13.0 | 15.49 |
| $\lambda_3$ | | | | | | | | | |
| $\lambda_4$ | | | | 21.45 | 21.45 | 21.45 | 3.68 | 13.0 | 16.68 |

FIG.34

| PATH IDENTIFICATION INFORMATION (61B) | RECEIVING TERMINAL PDL[dB] (63B) |
|---|---|
| $\lambda_1$ | 2.00 |
| $\lambda_2$ | 3.00 |
| $\lambda_3$ | |
| $\lambda_4$ | 4.00 |

FIG.35

| PATH IDENTIFICATION INFORMATION | A-B | B-C | C-D | D-E | E-F | F-G | RECEIVING TERMINAL PDL[dB] |
|---|---|---|---|---|---|---|---|
| $\lambda_1$ | 1.41 | 1.41 | | | | | 2.00 |
| $\lambda_2$ | | 1.73 | 1.73 | 1.73 | | | 3.00 |
| $\lambda_3$ | | | | | | | |
| $\lambda_4$ | | | | 2.31 | 2.31 | 2.31 | 4.00 |

~60B

NETWORK CONTROLLER AND SIGNAL QUALITY ESTIMATING METHOD

CROSS-REFERENCE TO RELATED APPLICATION

This application is based upon and claims the benefit of priority from the prior Japanese Patent Application No. 2015-125177, filed on Jun. 22, 2015, the entire contents of which are incorporated herein by reference.

FIELD

The embodiments discussed herein are related to a network controller and a signal quality estimating method.

BACKGROUND

An optical communication network system is designed before an operation of communication services, based on preset system conditions such as, for example, fiber parameters, a signal modulation format, a bit rate, a fiber input optical power. However, since actual parameters cannot be measured before the operation, values considering a margin are used for the design. However, since it is difficult to estimate an appropriate margin, for example, an excessive margin may be set. Therefore, a design value inferior to an actual system performance may be set, which may result in a lack of a system performance such as, for example, a reduction of a transmission distance.

In order to overcome this problem, various methods are under consideration including a first method that uses information of optical fibers and optical signals under operation to determine whether or not to permit a transmission of the entire span and a second method that measures the quality of optical signals under operation, stores the measured signal quality in a database, and uses the stored signal quality to design a system.

In the first method, a probability distribution of a crosstalk amount of a four wave mixing (FWM) of each span is calculated, and a probability distribution of a crosstalk amount of an FWM of the entire span is calculated based on the probability distribution of each span. In addition, from the probability distribution of the crosstalk amount of the FWM of the entire span, it is determined whether or not to permit a transmission of the entire span based on a predetermined criterion. However, while the first method requires fiber parameters, it is difficult to measure actual fiber parameters.

In contrast, the second method uses a case-based reasoning to estimate a signal quality. In the second method, known system conditions such as, for example, the number of wavelengths and an input power are stored in a database in association with signal qualities such as, for example, an optical signal to noise ratio (OSNR) and an error vector magnitude (EVM). Then, a signal quality of the system condition similar to a system condition of a wavelength path of an estimation target at which the signal quality is estimated, is retrieved from the database, and the retrieved signal quality is estimated as a signal quality of the wavelength path of the estimation target. The wavelength path labels the wavelength to transmit the optical signal.

FIG. 38 is an explanatory view illustrating one example of each wavelength path in a transmission system. The transmission system illustrated in FIG. 38 includes, for example, nodes A to G and also includes a span for each wavelength path $\lambda$. For example, a wavelength path $\lambda1$ corresponds to a path between the node A and the node C and is implemented with a span A-B and a span B-C.

A wavelength path $\lambda2$ corresponds to a path between the node B and the node E and is implemented with a span B-C, a span C-D, and a span D-E. A wavelength path $\lambda3$ corresponds to a path between the node A and the node G and is implemented with a span A-B, a span B-C, a span C-D, a span D-E, a span E-F, and a span F-G. A wavelength path $\lambda4$ corresponds to a path between the node D and the node G and is implemented with the span D-E, the span E-F, and the span F-G. For convenience of description, it is assumed that the wavelength paths $\lambda1$, $\lambda2$, and $\lambda4$ are wavelength paths under operation, the wavelength path $\lambda3$ is a wavelength path of an estimation target, and signal qualities of the wavelength paths $\lambda1$, $\lambda2$, and $\lambda4$ are stored in a database. The wavelength path of an estimation target is, for example, a path newly added in the transmission system or a path requiring an estimation of a signal quality such as, for example, a path of a switching destination at the time of path switching.

In the second method, for example, when the wavelength path $\lambda3$ of the estimation target is estimated, the signal qualities of the wavelength paths $\lambda1$, $\lambda2$, and $\lambda4$ stored in the database may be used to estimate the signal quality of the wavelength path $\lambda3$. That is, when there exists a wavelength path of the estimation target of the same span as a wavelength path under operation, the signal quality of the wavelength path under operation stored in the database is approximate to the signal quality of the wavelength path of the estimation target. As a result, the approximate signal quality of the wavelength path under operation may be used to estimate the signal quality of the wavelength path of the estimation target.

Related technologies are disclosed in, for example, Japanese Patent No. 4861960.

Related technologies are disclosed in, for example, Antonio Caballero et al., "Experimental demonstration of a cognitive quality of transmission estimator for optical communication systems," Opt. express, vol. 20, no. 26, B64-B70.

SUMMARY

According to an aspect of the invention, a network controller includes: a first acquisition unit configured to acquire, based on a signal quality amount of each of wavelength paths set in a network of an optical wavelength-multiplexed transmission system, a signal quality amount of each of spans in each of the wavelength paths; an arithmetic unit configured to calculate a signal quality amount of each of spans in a wavelength path of an estimation target, based on the signal quality amount acquired by the first acquisition unit; and an estimation unit configured to estimate a signal quality amount of the wavelength path of the estimation target, based on the signal quality amount calculated by the arithmetic unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory view illustrating an exemplary information storage unit;

FIG. 6 is an explanatory view illustrating an example (path OSNR) of an information storage unit used for operation of a first arithmetic unit;

FIG. 8 is an explanatory view illustrating an exemplary information storage unit used for an operation of a second arithmetic unit;

FIG. 9 is an explanatory view illustrating an exemplary information storage unit used for an operation of the second arithmetic unit;

FIGS. 10A and 10B are a flow chart illustrating an exemplary processing operation of an estimation device, which is involved in a first path estimating process;

FIGS. 13A and 13B are a flow chart illustrating an exemplary processing operation of an estimation device, which is involved in a second path estimating process;

FIG. 14 is an explanatory view illustrating an exemplary information storage unit used for the operation of the second arithmetic unit, as a modification of the first embodiment;

FIG. 15 is an explanatory view illustrating an exemplary information storage unit used for the operation of the second arithmetic unit, as a modification of the first embodiment;

FIG. 16 is an explanatory view illustrating an exemplary information storage unit used for the operation of the second arithmetic unit, as a modification of the first embodiment;

FIG. 17 is an explanatory view illustrating an exemplary information storage unit used for the operation of the first arithmetic unit, as a modification of the first embodiment;

FIG. 18 is an explanatory view illustrating an exemplary information storage unit used for the operation of the second arithmetic unit, as a modification of the first embodiment;

FIG. 19 is an explanatory view illustrating an exemplary information storage unit used for the operation of the second arithmetic unit, as a modification of the first embodiment;

FIG. 20 is an explanatory view illustrating an exemplary information storage unit used for the operation of the first arithmetic unit, as a modification of the second embodiment;

FIG. 27 is an explanatory view illustrating an exemplary information storage unit used for the operation of the first arithmetic unit of the third embodiment;

FIG. 34 is an explanatory view illustrating an exemplary first information storage unit of the fifth embodiment;

FIG. 35 is an explanatory view illustrating an example (PDL) of a first information storage unit used for operation of a fifth arithmetic unit;

DESCRIPTION OF EMBODIMENTS

Figure 38:
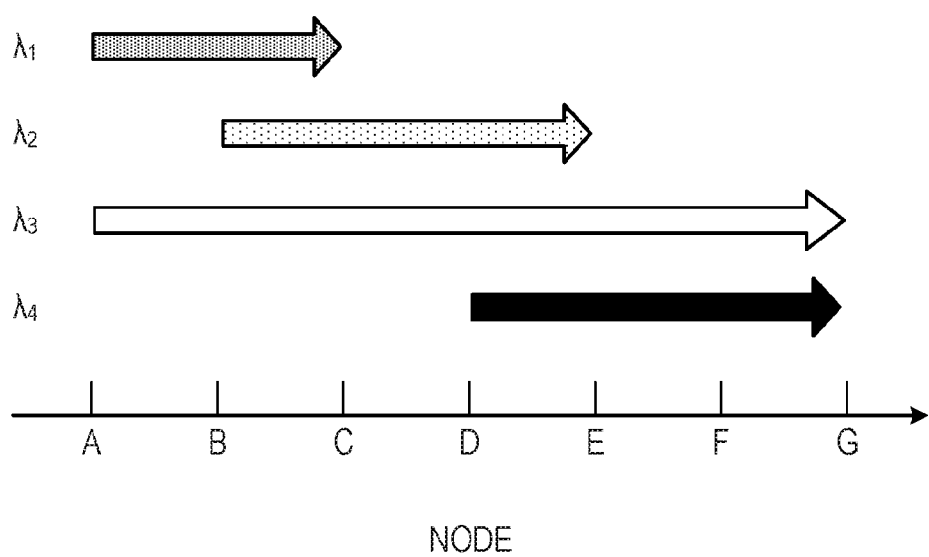
FIG. 38 is an explanatory view illustrating an exemplary span configuration of each wavelength path in the transmission system.

In the second method described above, when the amount of the database storing the signal quality of each wavelength path under operation is insufficient, the estimation precision for the signal quality of the wavelength path of the estimation target is deteriorated. For example, as illustrated in FIG. 38, since the wavelength path $\lambda 3$ of the estimation target has 6 spans while each of the wavelength paths $\lambda 1$, $\lambda 2$, and $\lambda 4$ has a maximum of 3 spans, an estimation error occurs in the signal quality of the wavelength path $\lambda 3$. That is, when the wavelength path of the same span as a span of the wavelength path of the estimation target is not present in the database, the estimation precision for the signal quality of the wavelength path of the estimation target is deteriorated. As a result, when the estimation error is large, there may be a case where a regenerator has to be inserted or a path setting has to be redesigned.

Hereinafter, embodiments of a network controller and a signal quality estimating method which are capable of improving the estimation precision for a signal quality of a wavelength path of an estimation target will be described in detail with reference to the drawings. However, the spirit and scope of the present disclosure are not limited by these embodiments. The following embodiments may be used in proper combination unless contradictory.

First Embodiment

Figure 1:
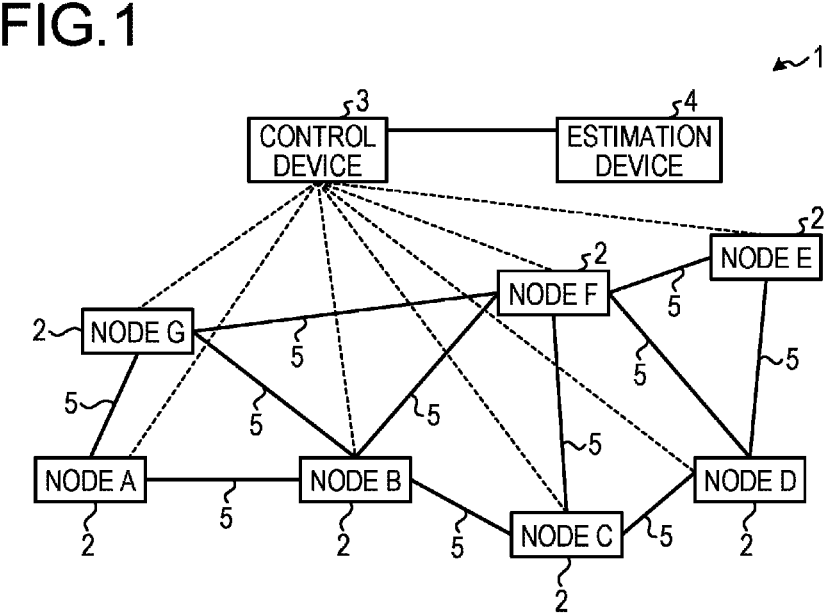
FIG. 1 is an explanatory view illustrating an exemplary transmission system according to a first embodiment.

FIG. 1 is an explanatory view illustrating an exemplary transmission system 1 according to a first embodiment. The transmission system 1 illustrated in FIG. 1 includes a plurality of nodes 2, a control device 3, and an estimation device 4. The nodes 2 are implemented with a total of 7 optical transmission devices of, for example, nodes A to G, which are interconnected by an optical fiber 5 for communication. Each node 2 is, for example, a reconfigurable optical add-drop multiplexer (ROADM) of a color-less direction-less (CD) or a ROADM of a color-less direction-less contention-less (CDC). Although the number of the nodes 2 is a total of 7 in this embodiment for convenience of description, the number of the nodes 2 is not limited thereto but may be appropriately changed. The transmission system 1 is, for example, an optical wavelength multiplexed transmission system multiplexing a plurality of wavelength paths.

The control device 3 is a device that collects a variety of information such as, for example, a signal quality of each node 2 in the transmission system 1. The estimation device 4 is a device which is connected to the control device 3 and estimates the signal quality of a wavelength path of an estimation target, which is different from a wavelength path under operation in the transmission system 1, according to a command from the control device 3.

Figure 2:
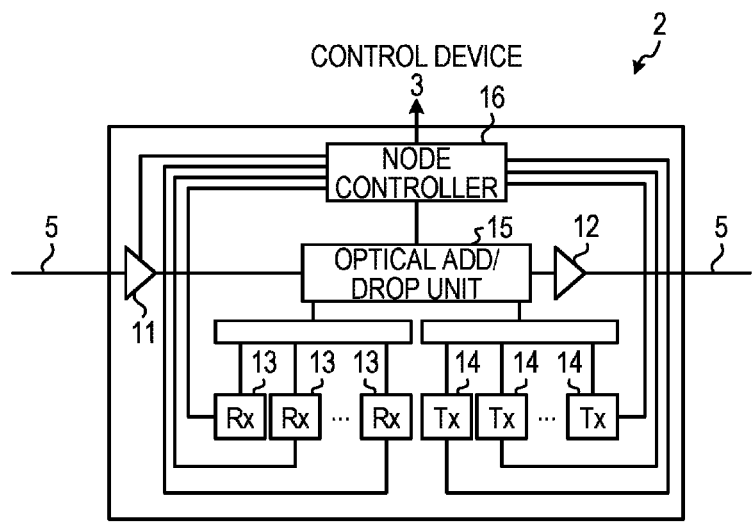
FIG. 2 is a block diagram illustrating an exemplary hardware configuration of a node.

FIG. 2 is a block diagram illustrating an exemplary hardware configuration of a node 2. The node illustrated in FIG. 2 includes an input amplifier 11, an output amplifier 12, a plurality of receivers (Rx) 13, a plurality of transmitters (Tx) 14, an optical add/drop unit 15, and a node controller 16. The input amplifier 11 is an optical amplifier that amplifies an optical signal input from the optical fiber 5. The output amplifier 12 is an optical amplifier that amplifies an optical signal to be output to the optical fiber 5. The Rx 13 is a receiver that receives an optical signal. The Tx 14 is a transmitter that transmits an optical signal. The optical add/drop unit 15 has a function of optically branching a portion of an optical signal communicating a wavelength path and optically inserting a new optical signal in the optical signal communicating the wavelength path, and a function of adjusting the power of the optical signal communicating the wavelength path. The optical add/drop unit 15 optically branches an optical signal and transmits the optically branched optical signal to a predetermined Rx 13. The optical add/drop unit 15 optically inserts an optical signal from the Tx 14 in an optical signal and outputs the optically inserted optical signal to the optical fiber 5 via the output amplifier 12.

The node controller 16 is connected in communication with the control device 3, measures a bit error rate (BER) of a wavelength path in the Rx 13, and informs the control device 3 of information including a result of the BER measurement. This information includes, for example, path identification information identifying a wavelength path and a BER of a wavelength path.

Figure 3:
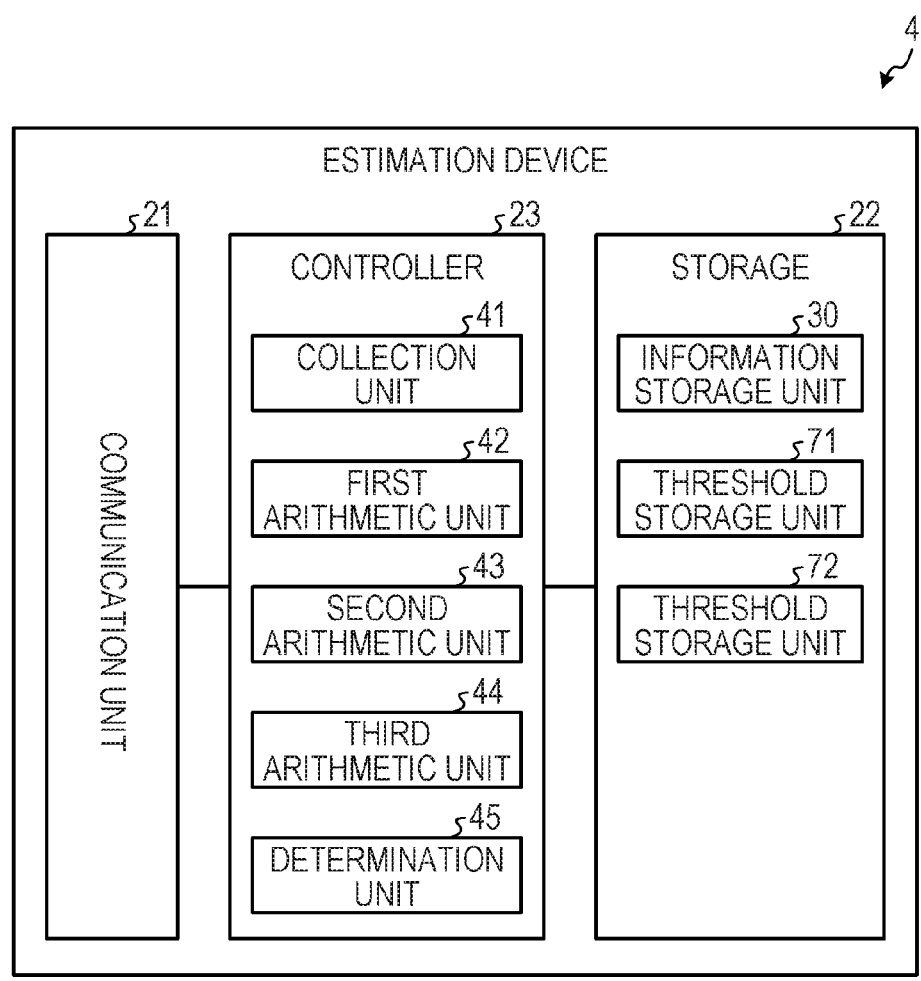
FIG. 3 is an explanatory view illustrating an exemplary functional configuration of an estimation device.

FIG. 3 is an explanatory view illustrating an exemplary functional configuration of the estimation device 4. The estimation device 4 illustrated in FIG. 3 includes a communication unit 21, a storage 22, and a controller 23. The communication unit 21 is a communication interface responsible for communication with the control device 3. The storage 22 is an area that stores a variety of information. The controller 23 controls the overall operation of the estimation device 4.

The storage 22 includes an information storage unit 30, a threshold storage unit 71, and a result storage unit 72. FIG. 4 is an explanatory view illustrating an exemplary information storage unit 30. The information storage unit 30 illustrated in FIG. 4 manages path identification information 31, an optical signal to noise ratio (OSNR) 32, a path OSNR 33, and a path BER 34 in association therebetween. The path identification information 31 identifies a wavelength path in the transmission system 1. The span OSNR 32 is a signal quality such as, for example, an OSNR for each span in a wavelength path. The transmission system 1 illustrated in FIG. 1 has 6 spans A-B, B-C, C-D, D-E, E-F, and F-G. Although it has been illustrated that 6 spans lie between the node A and the node G for convenience of description, the number of spans is not limited thereto but may be appropriately changed. The path OSNR 33 refers to an OSNR in the unit of a wavelength path. The path BER 34 refers to a BER in the unit of wavelength path. It is assumed that the information storage unit 30 stores the wavelength path information in an order of a longer wavelength.

The threshold storage unit 71 is an area that stores a BER threshold to be described later. The result storage unit 72 is an area that stores a transmission result indicating whether or not a wavelength path of an estimation target can be transmitted.

Figures 5A, 5B:
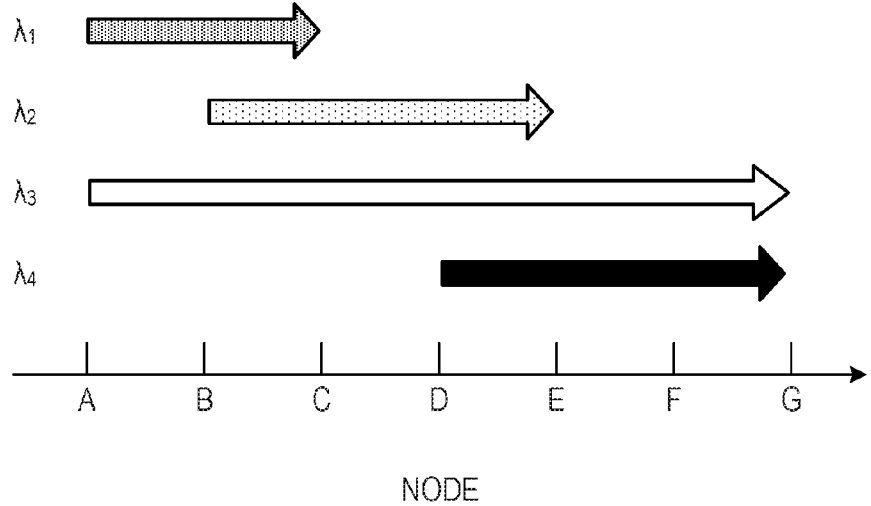
FIG. 5A is an explanatory view illustrating an exemplary span configuration of a wavelength path in the transmission system.
FIG. 5B is an explanatory view illustrating an exemplary information storage unit used for an operation of a collection unit.

The controller 23 includes a collection unit 41, a first arithmetic unit 42, a second arithmetic unit 43, a third arithmetic unit 44, and a determination unit 45. FIG. 5A is an explanatory view illustrating an exemplary span configuration of a wavelength path in the transmission system, and FIG. 5B is an explanatory view illustrating an exemplary information storage unit 30 used for the operation of the collection unit 41.

A wavelength path λ1 illustrated in FIG. 5A is implemented with spans A-B and B-C. A wavelength path λ2 is implemented with spans B-C, C-D, and D-E. A wavelength path λ3 is implemented with spans A-B, C-D, D-E, EF, and F-G. A wavelength path λ4 is implemented with the spans D-E, E-F, and F-G. For convenience of description, it is assumed that the wavelength paths λ1, λ2, and λ4 are wavelength paths under operation, and the wavelength path λ3 is a wavelength path of an estimation target.

The collection unit 41 collects path BERs of the wavelength paths λ1, λ2, and λ4 from the control device 3 and stores the path identification information and path BERs of the wavelength paths λ1, λ2, and λ4 in the information storage unit 30.

FIG. 6 is an explanatory view illustrating one example (path OSNR) of the information storage unit 30 used for operation of the first arithmetic unit 42. Assuming a dual polarization-quadrature phase shift keying (DP-QPSK) system, based on a path BER of a wavelength path under operation, the first arithmetic unit 42 calculates a path OSNR of the wavelength path according to the following equations (1), (2), and (3). The first arithmetic unit 42 is, for example, an acquisition unit which calculates a path OSNR of a wavelength path and sequentially stores a path OSNR of the wavelength path in the information storage unit 30 for path identification information of the wavelength path.

$$BER = \frac{1}{2} erfc\left(\sqrt{\frac{PathOSNRx \cdot Bn}{2Rs}}\right) \quad \text{[Equation 1]}$$

Where, Bn is a noise bandwidth, and Rs is a signal baud rate.

$$erfc(x) = \frac{2}{\sqrt{\pi}} \int_x^\infty e^{-t^2} dt \quad \text{[Equation 2]}$$

$$PathOSNRx = (erfc^{-1}(2BER))^2 \cdot \frac{2Rs}{Bn} \qquad \text{[Equation 3]}$$

Figure 7:
FIG. 7 is an explanatory view illustrating one example (OSNR) of an information storage unit used for operation of the first arithmetic unit.

FIG. 7 is an explanatory view illustrating one example (OSNR) of the information storage unit 30 used for operation of the first arithmetic unit 42. Based on a path OSNR of a wavelength path, the first arithmetic unit 42 calculates an OSNR of each span in the wavelength path according to the following equations (4) and (5). For example, the first arithmetic unit 42 calculates an OSNR of each span in the wavelength path by equalizing the path OSNR of the wavelength path with the number of spans of the wavelength path. Then, the first arithmetic unit 42 sequentially stores the calculated OSNR of each span in the information storage unit 30 for path identification information of the wavelength path.

$$\begin{aligned} \text{Path } OSNR &= (OSNR1^{-1} + OSNR2^{-1} + \ldots)^{-1} \qquad \text{[Equation 4]} \\ &= (k \cdot OSNR^{-1})^{-1} \end{aligned}$$

Where, an OSNRx is an OSNR of each span, an OSNR is an OSNR of each span after being equally divided, and k is the number of spans.

$$\text{Path OSNR} = k \cdot \text{OSNR} \qquad \text{[Equation 5]}$$

Based on an OSNR of each span in the existing wavelength path within the information storage unit 30, the second arithmetic unit 43 calculates an OSNR of each span in a wavelength path of an estimation target according to the above equations (4) and (5) and stores the calculated OSNR of each span in the information storage unit 30. Further, the second arithmetic unit 43 is an arithmetic unit which calculates an OSNR of each span in a wavelength path of an estimation target, based on an OSNR of a span in the existing wavelength path which matches at least some spans in the wavelength path of the estimation target. FIG. 8 is an explanatory view illustrating an exemplary information storage unit 30 used for the operation of the second arithmetic unit 43.

The second arithmetic unit 43 calculates an OSNR of each span in the wavelength path λ3 of an estimation target, based on an OSNR of each span in another wavelength path stored in the information storage unit 30. In addition, the second arithmetic unit 43 stores the calculated OSNR of each span in the wavelength path λ3 of the estimation target in a corresponding area in the information storage unit 30.

For example, the second arithmetic unit 43 calculates an OSNR of the span A-B in the wavelength path λ3 of an estimation target, based on an OSNR of the span A-B of the wavelength path λ1. At this time, since the number of OSNRs of the same span as the span A-B in the wavelength path λ3 in the information storage unit 30 is one, the second arithmetic unit 43 assigns the OSNR of the span A-B in the wavelength path λ1 to the OSNR of the span A-B in the wavelength path λ3. Then, the second arithmetic unit 43 stores the assigned OSNR of the span A-B in a corresponding area of the wavelength path λ3 in the information storage unit 30.

In addition, the second arithmetic unit 43 calculates an OSNR of the span B-C in the wavelength path λ3, based on an OSNR of the same span B-C in the wavelength path λ1 and the wavelength path λ2. At this time, the second arithmetic unit 43 determines that the number of OSNRs of the same span as the span B-C in the wavelength path λ3 in the information storage unit 30 is two, i.e., plural, and a wavelength of the wavelength path λ3 does not exist between the wavelength paths λ1 and λ2. Accordingly, the second arithmetic unit 43 calculates an OSNR of the same span of the wavelength path λ3 in a linear extrapolation of the OSNR of the span B-C of the wavelength paths λ1 and λ2. Then, the second arithmetic unit 43 stores the calculated OSNR of the span B-C in a corresponding area of the wavelength path λ3 in the information storage unit 30.

In addition, since the number of OSNRs of the same span as the span C-D in the wavelength path λ3 in the information storage unit 30 is one, the second arithmetic unit 43 assigns the OSNR of the span C-D in the wavelength path λ2 to the OSNR of the span C-D in the wavelength path λ3. Then, the second arithmetic unit 43 stores the assigned OSNR of the span C-D in a corresponding area of the wavelength path λ3 in the information storage unit 30.

In addition, the second arithmetic unit 43 calculates an OSNR of the span D-E in the wavelength path λ3, based on an OSNR of the same span D-E in the wavelength paths λ2 and λ4. At this time, the second arithmetic unit 43 determines that the number of OSNRs of the same span as the span D-E in the wavelength path λ3 in the information storage unit 30 is two, i.e., plural, and the wavelength of the wavelength path λ3 exists between the wavelength paths λ2 and λ4. Accordingly, the second arithmetic unit 43 calculates an OSNR of the same span D-E in the wavelength path λ3 in a linear interpolation of the OSNR of the span D-E of the wavelength paths λ2 and λ4. Then, the second arithmetic unit 43 stores the calculated OSNR of the span D-E in a corresponding area of the wavelength path λ3 in the information storage unit 30.

In addition, since the number of OSNRs of the same span as the span E-F in the wavelength path λ3 in the information storage unit 30 is one, the second arithmetic unit 43 assigns the OSNR of the span E-F in the wavelength path λ4 to the OSNR of the span E-F in the wavelength path λ3. Then, the second arithmetic unit 43 stores the assigned OSNR of the span E-F in a corresponding area of the wavelength path λ3 in the information storage unit 30.

In addition, since the number of OSNRs of the same span as the span F-G in the wavelength path λ3 in the information storage unit 30 is one, the second arithmetic unit 43 assigns the OSNR of the span F-G in the wavelength path λ4 to the OSNR of the span F-G in the wavelength path λ3. Then, the second arithmetic unit 43 stores the assigned OSNR of the span F-G in a corresponding area of the wavelength path λ3 in the information storage unit 30.

Then, based on an OSNR of each span in the wavelength path λ3 of the estimation target within the information storage unit 30, the second arithmetic unit 43 calculates a path OSNR according to the above equations (4) and (5) and stores the calculated path OSNR in the information storage unit 30.

FIG. 9 is an explanatory view illustrating an exemplary information storage unit 30 used for the operation of the second arithmetic unit 43. It is assumed that only the OSNR of the wavelength paths λ1 and λ2 is stored in the information storage unit 30.

When calculating an OSNR of each span in the wavelength path λ3 of the estimation target, the second arithmetic unit 43 assigns an OSNR in the spans A-B, C-D, and D-E to an OSNR of the same span of a different wavelength path. In addition, the second arithmetic unit 43 calculates an OSNR in the span B-C in a linear extrapolation of the OSNR of the different wavelength path. However, the OSNR of the spans E-F and F-G in the wavelength path λ3 of the estimation target has no OSNR of the same span in the information storage unit 30. Therefore, the second arithmetic unit 43 calculates an average of the calculated OSNRs of the spans A-B, B-C, C-D, and D-E in the wavelength path λ3. Then, the second arithmetic unit 43 stores the calculated OSNR average, as an OSNR of the spans E-F and F-G, in the information storage unit 30.

The third arithmetic unit 44 is, for example, an estimation unit which calculates a path BER of the wavelength path λ3 of the estimation target, based on a path OSNR of the wavelength path λ3 of the estimation target, which is stored in the information storage unit 30, according to the above equation (1), and stores the calculated path BER in the information storage unit 30.

The determination unit 45 is, for example, a first determination unit which determines whether or not the path BER of the wavelength path λ3 of the estimation target, which is calculated in the third arithmetic unit 44, is equal to or less than a BER threshold stored in the threshold storage unit 71. When the path BER of the wavelength path λ3 of the estimation target is equal to or less than the BER threshold, the determination unit 45 determines that the wavelength path λ3 of the estimation target can be transmitted, and stores a result of the determination in the result storage unit 72. The result of the determination includes path identification information and a path BER of any wavelength path, in addition to the transmission permission, but may include only the transmission permission and the path identification information.

When the path BER of the wavelength path λ3 of the estimation target is not equal to or less than the BER threshold, the determination unit 45 determines that the wavelength path λ3 of the estimation target cannot be transmitted, and stores a result of the determination in the result storage unit 72. Then, the communication unit 21 informs the control device 3 of the determination result stored in the result storage unit 72. Then, based on the path identification information and the path BER in the determination result, the control device 3 performs an operation such as, for example, adjusting an input power in a wavelength path of an estimation target or inserting a regenerator in a wavelength path.

Figure 10B:
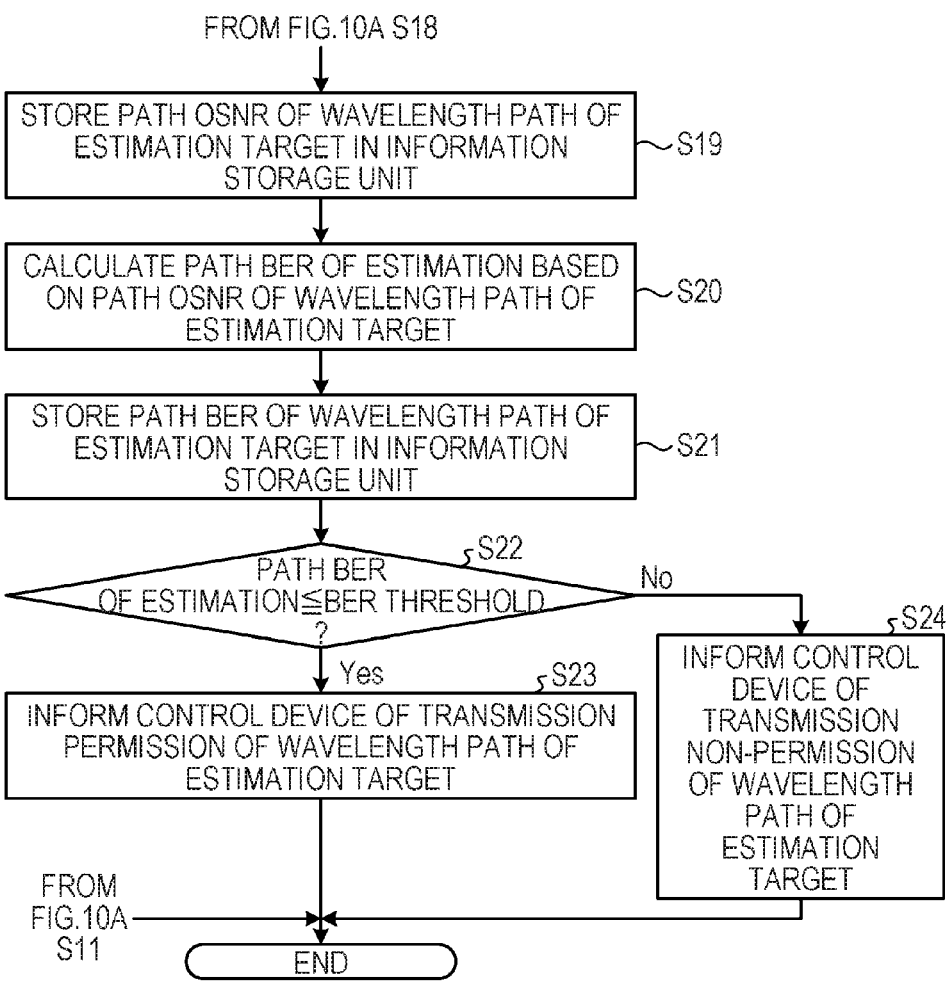

Next, the operation of the transmission system 1 according to the first embodiment will be described. FIGS. 10A and 10B are a flow chart illustrating an exemplary processing operation of the estimation device 4, which is involved in a first path estimating process. The first path estimating process illustrated in FIGS. 10A and 10B is a process of calculating an OSNR in a wavelength path of an estimation target based on an OSNR of each span for each wavelength path and estimating a path BER of the wavelength path of the estimation target based on the calculated OSNR of each span in the wavelength path of the estimation target.

In FIGS. 10A and 10B, the controller 23 in the estimation device 4 determines whether or not an estimation request for an estimation path has been detected from the control device 3 (Operation S11). When it is determined that the estimation request for the estimation path has been detected (Yes in Operation S11), the first arithmetic unit 42 in the controller 23 calculates a path OSNR for each wavelength path based on a path BER for each wavelength path in the information storage unit 30 (Operation S12). Then, the first arithmetic unit 42 stores the calculated path OSNR for each wavelength path in the information storage unit 30 (Operation S13).

In addition, based on a path OSNR for each wavelength path in the information storage unit 30, the first arithmetic unit 42 calculates an OSNR of each span in the wavelength path (Operation S14). The first arithmetic unit 42 stores the calculated OSNR of each span for each wavelength path in a corresponding area in the information storage unit 30 (Operation S15).

Based on an OSNR of each span for each wavelength path in the information storage unit 30, the second arithmetic unit 43 in the controller 23 calculates an OSNR of each span in a wavelength path of an estimation target (Operation S16). The second arithmetic unit 43 stores the calculated OSNR of each span in the wavelength path of the estimation target in the information storage unit 30 (Operation S17).

Based on an OSNR of each span in the wavelength path of the estimation target in the information storage unit 30, the second arithmetic unit 43 calculates a path OSNR of the wavelength path of the estimation target (Operation S18). The second arithmetic unit 43 stores the calculated path OSNR of the wavelength path of the estimation target in the information storage unit 30 (Operation S19). Then, based on the path OSNR of the wavelength path of the estimation target in the information storage unit 30, the third arithmetic unit 44 in the controller 23 calculates a path BER of the wavelength path of the estimation target (Operation S20).

In addition, the third arithmetic unit 44 stores the calculated path BER of the wavelength path of the estimation target in the information storage unit 30 (Operation S21). The determination unit 45 in the controller 23 determines whether or not the path BER of the wavelength path of the estimation target is equal to or less than a BER threshold (Operation S22).

When it is determined that the path BER of the wavelength path of the estimation target is equal to or less than the BER threshold (Yes in Operation S22), the determination unit 45 determines that the wavelength path of the estimation target can be transmitted, and informs the control device 3 of the transmission permission (Operation S23). Then, the processing operation illustrated in FIGS. 10A and 10B is ended. When it is determined that the path BER of the wavelength path of the estimation target is not equal to or less than the BER threshold (No in Operation S22), the determination unit 45 determines that the wavelength path of the estimation target cannot be transmitted, and informs the control device 3 of the transmission non-permission (Operation S24). Then, the processing operation illustrated in FIGS. 10A and 10B is ended. When it is determined that the estimation request for the estimation path has not been detected (No in Operation S11), the controller 23 ends the processing operation illustrated in FIGS. 10A and 10B.

The estimation device 4 of the first embodiment calculates a path OSNR based on a path BER of a wavelength path in the information storage unit 30 and calculates an OSNR of each span in the wavelength path based on the calculated path OSNR. In addition, based on the OSNR of each span in a wavelength path, which is stored in the information storage unit 30, the estimation device 4 calculates an OSNR of each span in a wavelength path of an estimation target. In addition, the estimation device 4 calculates a path OSNR based on the OSNR of each span in the wavelength path of the estimation target and estimates a path BER of the wavelength path of the estimation target based on the calculated path OSNR. As a result, it is possible to improve the estimation precision for the path BER of the wavelength path of the estimation target. In addition, based on a result of the estimation, by achieving a margin distribution suitable for large capacity and long distance in the transmission system 1, it is possible to achieve removal of an extra regenerator and shorten time taken to set wavelength paths in the transmission system 1.

When the path BER of estimation of the wavelength path of the estimation target is equal to or less than the BER threshold, the estimation device 4 informs the control device 3 of the transmission permission of the wavelength path of the estimation target. As a result, the control device 3 may recognize the transmission permission of the wavelength path of the estimation target.

When the path BER of estimation of the wavelength path of the estimation target is not equal to or less than the BER threshold, the estimation device 4 informs the control device 3 of the transmission non-permission of the wavelength path of the estimation target. As a result, the control device 3 may recognize the transmission non-permission of the wavelength path of the estimation target.

In the first embodiment, after a determination on whether or not a wavelength path of an estimation target can be transmitted is made based on a path BER of estimation of a wavelength path of an estimation target, the control device 3 is informed of the transmission permission/non-permission of the wavelength path of the estimation target. However, the estimation device 4 stores a result of the determination on the transmission permission/non-permission of the wavelength path of the estimation target in the result storage unit 72, determines whether or not there exists an undetermined wavelength path of an estimation target, and, when there exists the undetermined wavelength path of the estimation target, estimates a path BER of the wavelength path of the estimation target. In addition, the estimation device 4 determines whether or not the wavelength path of the estimation target can be transmitted, based on the estimated path BER, and stores a result of the determination in the result storage unit 72. Then, the estimation device 4 makes a sequential determination on whether or not the wavelength path of the estimation target can be transmitted, until there exists no undetermined wavelength path of an estimation target, and stores the result of the determination in the result storage unit 72 in a sequential manner. When the transmission permission/non-permission of wavelength paths of all estimation targets are stored in the result storage unit 72, the estimation device 4 may inform the control device 3 of the transmission permission/non-permission of wavelength paths of all estimation targets stored in the result storage unit 72.

In the first embodiment, when the path BER of estimation of a wavelength path of an estimation target is equal to or less than a BER threshold, the estimation device 4 determines that the wavelength path of the estimation target can be transmitted. However, the estimation precision of an estimation path BER serving as a determination material of the transmission permission/non-permission may be enhanced, as will be described below as a second embodiment.

Second Embodiment

Figure 11:
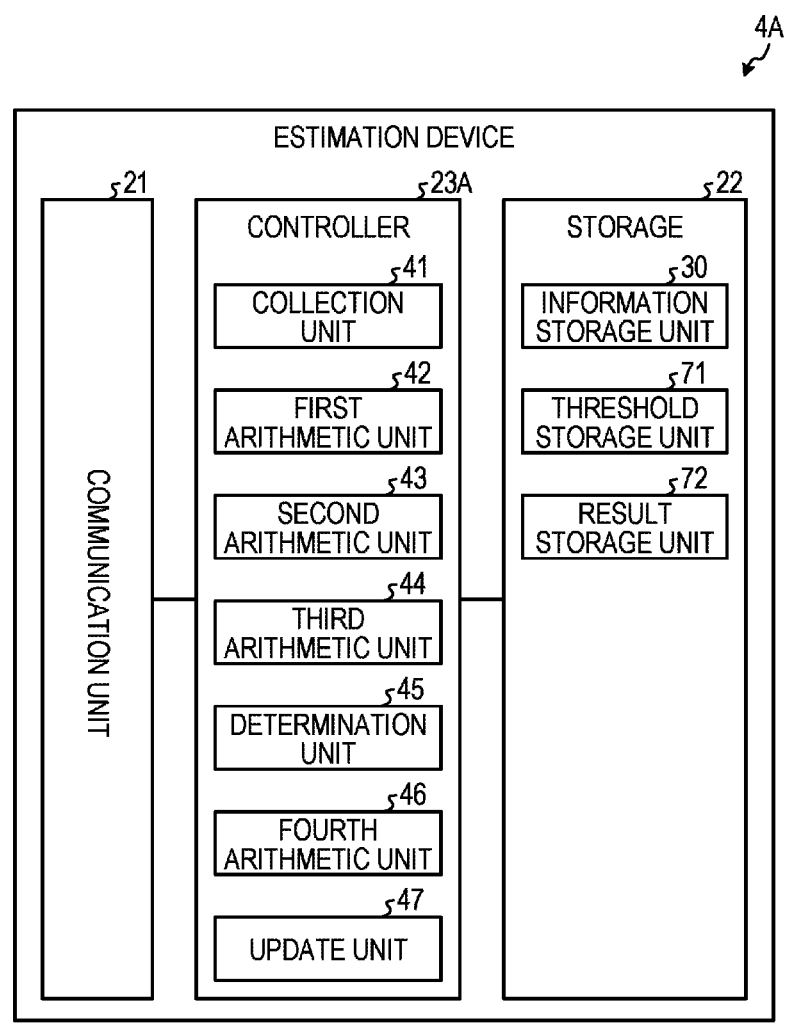
FIG. 11 is an explanatory view illustrating an exemplary functional configuration of an estimation device according to a second embodiment.

FIG. 11 is an explanatory view illustrating an exemplary functional configuration of an estimation device 4A according to a second embodiment. The same configurations and operations as the transmission system 1 of the first embodiment are denoted by the same reference numerals and, therefore, explanation thereof will not be repeated.

The estimation device 4A illustrated in FIG. 11 is different from the estimation device 4 illustrated in FIG. 3 in that the former further includes a fourth arithmetic unit 46 and an update unit 47 in a controller 23A.

The controller 23A calculates a path BER of a wavelength path of an estimation target based on a path OSNR of the wavelength path of the estimation target and then instructs the control device 3 to communicate an optical signal to the wavelength path of the estimation target. Then, the control device 3 measures a path BER after the communicating of the optical signal to the wavelength path of the estimation target and informs the estimation device 4A of the measured path BER of the wavelength path of the estimation target. The fourth arithmetic unit 46 in the controller 23A stores the measured path BER of the wavelength path of the estimation target, which is obtained from the control device 3, in a corresponding area in the information storage unit 30.

Figure 12:
FIG. 12 is an explanatory view illustrating an exemplary information storage unit used for an operation of a fourth arithmetic unit.

The fourth arithmetic unit 46 calculates the path OSNR of the wavelength path of the estimation target based on the measured path BER of the wavelength path of the estimation target in the information storage unit 30. FIG. 12 is an explanatory view illustrating an exemplary information storage unit 30 used for the operation of the fourth arithmetic unit 46. As illustrated in FIG. 12, the fourth arithmetic unit 46 stores the path OSNR of the wavelength path of the estimation target in a corresponding area in the information storage unit 30. Then, the update unit 47 calculates a difference between the path OSNR based on the measured path BER and the path OSNR based on the estimated path BER according to the following equations (6) and (7) and updates an OSNR of each span in the wavelength path of the estimation target in the information storage unit 30 based on the calculated difference. As a result, it is possible to acquire an OSNR of each span which reflects an actual signal communication of the wavelength path of the estimation target.

$$\Delta = \frac{1}{k}(\text{Path } OSNR_{mca}^{-1} - \text{Path } OSNR_{est}^{-1}) \qquad \text{[Equation 6]}$$

$$OSNRx_{update} = (OSNR_x^{-1} - \Delta)^{-1} \qquad \text{[Equation 7]}$$

Then, the third arithmetic unit 44 calculates a path OSNR based on the updated OSNR of each span in the wavelength path of the estimation target in the information storage unit 30, calculates a path BER of estimation based on the calculated path OSNR, and stores the calculated path BER of estimation in the information storage unit 30.

Next, the operation of the transmission system 1 of the second embodiment will be described. FIGS. 13A and 13B are a flow chart illustrating an exemplary processing operation of the estimation device 4A, which is involved in a second path estimating process. The second path estimating process illustrated in FIGS. 13A and 13B is a process of estimating a path BER of a wavelength path of an estimation target, communicating a signal to the wavelength path of the estimation target, measuring a path BER of wavelength path of the estimation target, and updating an OSNR of each span in the wavelength path of the estimation target based on the measured path BER.

In FIGS. 13A and 13B, the controller 23A in the estimation device 4A determines whether or not the path BER of estimation of the wavelength path of the estimation target is equal to or less than a BER threshold (Operation S22). When it is determined that the path BER of estimation is equal to or less than a BER threshold (Yes in Operation S22), the controller 23A instructs the control device 3 to communicate a signal to the wavelength path of the estimation target (Operation S31) and to measure an actual path BER of the wavelength path of the signal communication.

The collection unit 41 in the controller 23A measures the actual path BER of the wavelength path of the estimation target from the control device 3 (Operation S32) and stores the measured path BER of the wavelength path of the estimation target in the information storage unit 30 (Operation S33). The fourth arithmetic unit 46 in the controller 23A calculates a path OSNR based on the measured path BER of the wavelength path of the estimation target in the information storage unit 30 (Operation S34).

The update unit 47 in the controller 23A calculates a difference between the path OSNR based on the measured path BER and the path OSNR based on the path BER of estimation (Operation S36). Based on the calculated difference, the update unit 47 updates an OSNR of each span in the wavelength path of the estimation target, which is stored in the information storage unit 30 (Operation S37). Then, the second arithmetic unit 43 calculates a path OSNR based on the updated OSNR of each span in the wavelength path of the estimation target (Operation S38) and stores the calculated path OSNR of the wavelength path of the estimation target in the information storage unit 30 (Operation S39).

In addition, the third arithmetic unit 44 calculates a path BER of estimation after the update in the path OSNR of the wavelength path of the estimation target, which is stored in the information storage unit 30 (Operation S40) and stores the calculated path BER of estimation after the update in the information storage unit 30 (Operation S41). The controller 23A determines whether or not the measured path BER is equal to or less than a BER threshold (Operation S42). When it is determined that the measured path BER is equal to or less than the BER threshold (Yes in Operation S42), the controller 23A informs the control device 3 of transmission permission of the wavelength path of the estimation target (Operation S43) and ends the processing operation illustrated in FIGS. 13A and 13B. When it is determined that the measured path BER is not equal to or less than the BER threshold (No in Operation S42), the controller 23A proceeds to Operation S24 to inform the control device 3 of transmission non-permission of the wavelength path of the estimation target.

When a path BER of estimation of the wavelength path of the estimation target is equal to or less than a BER threshold, the estimation device 4A of the second embodiment communicates a signal to the wavelength path of the estimation target and acquires a measured path BER related to the communication signal. Based on the measured path BER, the estimation device 4A calculates a measured path OSNR of the wavelength path of the estimation target. In addition, based on a difference between the measured path OSNR and the estimated path OSNR, the estimation device 4A updates an OSNR of each span in the wavelength path of the estimation target, which is stored in the information storage unit 30. In addition, the estimation device 4A calculates a path OSNR based on the updated OSNR of each span in the wavelength path of the estimation target, which is stored in the information storage unit 30, and calculates a path BER of the wavelength path of the estimation target based on the calculated path OSNR. As a result, the estimation device 4A may estimate a path BER reflecting the measured path BER of the wavelength path of the estimation target.

As described above, when a plurality of OSNRs of a different wavelength path exists in the same span in the wavelength path of the estimation target, the second arithmetic unit 43 of the first embodiment calculates an OSNR of the corresponding span in the wavelength path of the estimation target in a linear extrapolation or linear interpolation. FIG. 14 is an explanatory view illustrating an exemplary information storage unit 30 used for the operation of the second arithmetic unit 43, as a modification of the first embodiment. The second arithmetic unit 43 is not limited to the linear extrapolation or linear interpolation but may calculate the OSNR of the corresponding span in the wavelength path of the estimation target, for example, based on an average of all OSNRs of the same spans B-C and D-E.

FIG. 15 is an explanatory view illustrating an exemplary information storage unit 30 used for the operation of the second arithmetic unit 43, as a modification of the first embodiment. It may be assumed that the estimation device 4 recognizes that a signal power of the wavelength path $\lambda 3$ of the estimation target is lower by 1 dB than a signal power of the wavelength paths $\lambda 1$, $\lambda 2$, and $\lambda 4$. In this case, when a plurality of OSNRs of a different wavelength path exists in each span in the wavelength path $\lambda 3$ of the estimation target, the second arithmetic unit 43 may calculate an OSNR of the same span of the wavelength path $\lambda 3$ of the estimation target based on the OSNR lowered by 1 dB of the same span of the different wavelength path. When one OSNR of the different wavelength path exists in each span in the wavelength path $\lambda 3$ of the estimation target, the second arithmetic unit 43 assigns the OSNR lowered by 1 dB of the same span of the different wavelength path, as an OSNR of the same span.

FIG. 16 is an explanatory view illustrating an exemplary information storage unit 30 used for the operation of the second arithmetic unit 43, as a modification of the first embodiment. When no OSNR of the different wavelength path exists in the corresponding span in the wavelength path of the estimation target, the second arithmetic unit 43 of the first embodiment calculates an OSNR of the corresponding span based on an average of OSNRs of each span in the wavelength path of the estimation target, as illustrated in FIG. 9. However, the second arithmetic unit 43 is not limited to such an average. For example, as illustrated in FIG. 16, it is assumed that OSNRs of the spans A-B, B-C, D-E, E-F, and F-G in the wavelength path of the estimation target have already been calculated, and an OSNR of the span C-D is uncalculated. In this case, the OSNR of the span C-D may be calculated in a linear interpolation of the OSNRs of the spans B-C and D-E adjacent to the span C-D.

FIG. 17 is an explanatory view illustrating an exemplary information storage unit 30 used for the operation of the first arithmetic unit 42, as a modification of the first embodiment. The first arithmetic unit 42 equally divides a path OSNR of a wavelength path by the number of spans. However, the spans in the wavelength path have different span distances. However, the first arithmetic unit 42 may manage the span distances of the spans in the wavelength path and calculate an OSNR of each span based on the span distance for each span according to the following equation (8) using a weighting coefficient reflecting the span distances. As a result, it is possible to calculate an OSNR reflecting an actual span distance for each span in a wavelength path. This may be equally applied to the second arithmetic unit 43 and the update unit 47, in addition to the first arithmetic unit 42.

$$OSNR1 = \text{Path OSNR}/a$$

$$OSNR2 = \text{Path OSNR}/b$$

$$OSNR3 = \text{Path OSNR}/c \qquad \text{[Equation 8]}$$

Where, a, b, and c are weighting coefficients.

In addition, the first arithmetic unit 42 may manage the number of use wavelengths in the wavelength path, instead of the span distances, and may calculate an OSNR of each span according to an equation using a weighting coefficient of the number of use wavelengths. This equation is [Weighting coefficient=(the number of use wavelengths of corresponding span÷the total number of use wavelengths of all spans in wavelength path)]. The total number of wavelengths being used corresponds to the sum of wavelengths used in each span in the wavelength path. As a result, it is possible to calculate an OSNR reflecting the actual number of the wavelengths being used for each span in a wavelength path. This may be equally applied to the second arithmetic unit 43 and the update unit 47, in addition to the first arithmetic unit 42.

In addition, the first arithmetic unit 42 may manage an input power of a wavelength path, instead of the span distances, and may calculate an OSNR of each span according to the following equation (9) using a weighting coefficient of the input power. As a result, it is possible to calculate an OSNR reflecting an actual input power for each span in a wavelength path. This may be equally applied to the second arithmetic unit 43 and the update unit 47, in addition to the first arithmetic unit 42.

$$\text{Weighting coefficient for span } x = \frac{\sum_i P_{x,i}}{\sum_x \sum_i P_{x,i}} \qquad \text{[Equation 9]}$$

Where, $P_{x,j}$ is a power of ith wavelength of span x.

In addition, the first arithmetic unit 42 may calculate an OSNR of each span according to the following equation (10) using weighting coefficients of span distances and an input power of a wavelength path. As a result, it is possible to calculate an OSNR reflecting actual span distances and input power for each span in a wavelength path. This may be equally applied to the second arithmetic unit 43 and the update unit 47, in addition to the first arithmetic unit 42.

$$\text{Weighting coefficient for span } x = \frac{L_x \sum_i P_{x,i}}{\sum_x \left( L_x \sum_i P_{x,i} \right)} \qquad \text{[Equation 10]}$$

Where, $L_x$ is fiber length of span x.

The second arithmetic unit 43 calculates an OSNR for each span in a wavelength path of an estimation target and stores the calculated OSNR in the information storage unit 30 of the first embodiment. Accordingly, before the operation of the second arithmetic unit 43, there exists no OSNR for each span in the wavelength path of the estimation target in the information storage unit 30. However, as illustrated in FIG. 18A, an initial value may be preset in the OSNR for each span in the wavelength path of the estimation target. In this case, when calculating the OSNR for each span in the wavelength path of the estimation target, the second arithmetic unit 43 compares the initial value with an OSNR of the same span of a different wavelength path. When the OSNR of the same span of the different wavelength path is larger than the initial value, the second arithmetic unit 43 may assign the larger OSNR as an OSNR of the corresponding span, instead of the initial value.

In addition, when calculating the OSNR for each span in the wavelength path of the estimation target, the second arithmetic unit 43 compares the initial value with an OSNR of the same span of a different wavelength path. When the OSNR of the same span of the different wavelength path is smaller than the initial value, the second arithmetic unit 43 may assign the smaller OSNR as an OSNR of the corresponding span, instead of the initial value.

FIG. 18 is an explanatory view illustrating an exemplary information storage unit 30 used for operation of the second arithmetic unit 43, as a modification of the first embodiment. It is assumed that the information storage unit 30 corresponds to a state before the operation of each span in a wavelength path of an estimation target, and an initial value is set in an OSNR of each span of the wavelength path λ3 of the estimation target, as illustrated in FIG. 18A. Then, as illustrated in FIG. 18B, the second arithmetic unit 43 may average an OSNR of the corresponding span of a different wavelength path and the initial value and may set the average to the OSNR of the corresponding span.

FIG. 19 is an explanatory view illustrating an exemplary information storage unit 30 used for the operation of the second arithmetic unit 43, as a modification of the first embodiment. The second arithmetic unit 43 calculates an OSNR of each span in a wavelength path of an estimation target based on an OSNR of each span in a different wavelength path, and stores the calculated OSNR of each span in the information storage unit 30 as illustrated in FIG. 19. However, a span distance may be considered, in which case the second arithmetic unit 43 calculates an OSNR of the corresponding span in the wavelength path of the estimation target, updates the calculated OSNR of the corresponding span according to the span distance of the corresponding span, and then, stores the updated OSNR in the information storage unit 30. In addition, the second arithmetic unit 43 updates the OSNR of the corresponding span according to the following equations (11) and (12).

$$\Delta_x = \frac{\text{Corresponding span fiber length}}{\text{Total fiber strength}} \qquad \text{[Equation 11]}$$

$$OSNRx_{update} = (OSNR_x^{-1} - \Delta_x)^{-1} \qquad \text{[Equation 12]}$$

$$(PathOSNR_{mca}^{-1} - PathOSNR_{cst}^{-1})$$

Then, the second arithmetic unit 43 updates the OSNRs of all spans in the wavelength path of the estimation target and then calculates an path OSNR in the wavelength path of the estimation target based on the updated OSNRs of all spans. Then, the third arithmetic unit 44 calculates a path BER of estimation based on the calculated OSNR in the wavelength path of the estimation target and then stores the calculated path BER of estimation in the information storage unit 30.

FIG. 20 is an explanatory view illustrating an exemplary information storage unit 30 used for the operation of the first arithmetic unit 42, as a modification of the second embodiment. In the transmission system 1, when a signal is communicated to a wavelength path of an estimation target, a path BER of a different wavelength path adjacent to the wavelength path of the estimation target is changed. Therefore, after communicating of the optical signal to the wavelength path λ3 of the estimation target, the estimation device 4A may measure path BERs of different wavelength paths λ1, λ2, and λ4 and store the measured path BERs of different wavelength paths λ1, λ2, and λ4 in the information storage unit 30, as illustrated in FIG. 20A.

The first arithmetic unit 42 calculates a path OSNR based on the measured path BERs of the wavelength paths λ1, λ2, and λ4 stored in in the information storage unit 30 and calculates an OSNR of each span in each wavelength path based on the calculated path OSNR. In addition, the first arithmetic unit 42 may weight the OSNR of each span in each wavelength path with a span distance, as illustrated in FIG. 20B, and store the weighted OSNR of each span in the information storage unit 30.

Although it has been illustrated in the first embodiment that the BER threshold $BER_{th}$ stored in the threshold storage unit 71 is a fixed value, the BER threshold may vary depending on system conditions in the transmission system 1. For example, in consideration of nonlinearity such as, for example, cross-phase modulation and four-wave mixing, the BER threshold may be variably set depending on a wavelength utilization of the entire system according to the following equation (13). In this case, values obtained by numerical calculations or experiments may be used for the function and, when the wavelength utilization is low, the BER threshold may be set to be low in consideration of optical fiber nonlinearity expected to increases in the future.

$$BER_{th} = f\left(\frac{\sum_x \lambda usednum_x}{\sum_x \lambda num_x}\right) \quad \text{[Equation 13]}$$

Where, $\lambda usednum_x$ is the number of wavelengths being used in span x and $\lambda num_x$ is the number of wavelengths usable in span x.

In addition, in consideration of nonlinearity such as, for example, cross-phase modulation and four-wave mixing, the BER threshold may be variably set depending on a power utilization of the entire system according to the following equation (14). In this case, values obtained by numerical calculations or experiments may be used for the function and, when the power utilization is low, the BER threshold may be set to be low in consideration of optical fiber nonlinearity expected to increases in the future.

$$BER_{th} = f\left(\frac{\sum_x \sum_i P_{x,i}}{\sum_x P\max_x}\right) \quad \text{[Equation 14]}$$

Where, $P_{x,i}$ is a power of ith wavelength of span x, and $P\max_x$ is the maximum input power of span x.

In addition, conversely, there is a case where the BER is improved with an increase in a wavelength path. For example, at the time of optical filter multi-stage pass, the BER may be improved as spectrum narrowing by optical filters is alleviated by adding an adjacent wavelength. To cope with this, a BER threshold may be set by using the number of optical filter pass stages at the point of time of estimation, the preset number of optical filter pass stages in the future, and a BER improvement per one stage pass.

In addition, when the wavelength path of the estimation target lies in a long wavelength side of a wavelength division multiplex (WDM) signal band, and a signal is added to a short wavelength side later, OSNR improvement may be achieved as a signal in the long wavelength side is amplified by the Raman amplification effect. To cope with this, a BER threshold may be set by grasping the Raman amplification effect at the point of estimation time from wavelength use situations of signal wavelengths and WDM signals at the point of estimation time in consideration of a difference between the Raman amplification effect at the point of time of estimation and a preset Raman amplification effect in future.

In addition, in an erbium-doped optical amplifier (EDFA), the more number of wavelengths in use provides a low noise figure (NF), resulting in improvement of performance. In addition, the less number of wavelengths in use provides a greater effect of tilt of EDFA. In the meantime, the more number of wavelengths provides a smaller effect of tilt. In this case, as described above, a BER threshold may be set by grasping NF of EDFA, a tilt situation, and the Raman amplification effect at the point of time of estimation from wavelength use situations of signal wavelengths and WSM signals at the point of estimation time in consideration of a difference between a state of the EDFA at the point of estimation time and a preset state of EDFA.

In addition, the first arithmetic unit 42 of the first embodiment calculates a path OSNR of a wavelength path based on a path BER of the existing wavelength path and calculates an OSNR of each span in the wavelength path based on the calculated path OSNR. The second arithmetic unit 43 calculates an OSNR of each span in a wavelength path of an estimation target based on an OSNR of each span in the existing wavelength path. However, the calculation of path BER of the wavelength path of the estimation target is not limited to the path BER of the existing wavelength path, as will be described below as a third embodiment. The same configurations and operations as the transmission system 1 of the first embodiment are denoted by the same reference numerals and, therefore, explanation thereof will not be repeated.

Third Embodiment

Figure 21:
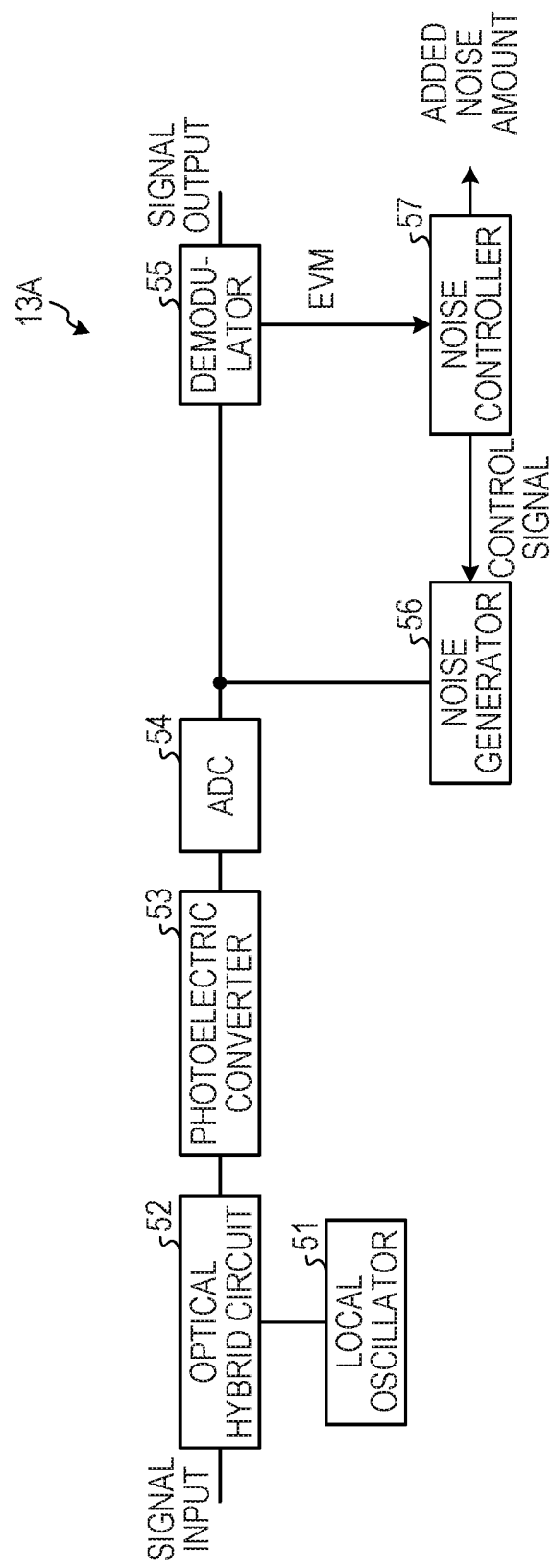
FIG. 21 is an explanatory view illustrating an exemplary Rx according to a third embodiment.

FIG. 21 is an explanatory view illustrating an exemplary Rx 13A according to a third embodiment. The Rx 13A illustrated in FIG. 21 corresponds to a receiver employing a digital coherent signal processing technique. A plurality of Rxs 13A is contained in each node 2. The Rx 13A includes a local oscillator 51, an optical hybrid circuit 52, a photoelectric converter 53, an analog-digital converter (ADC) 54, a demodulator 55, a noise generator 56, and a noise controller 57.

The local oscillator 51 is a laser diode or the like that outputs local oscillated light. The optical hybrid circuit 52 mixes signal light and the local oscillated light and uses a phase difference between the signal light and the local oscillated light to extract an I or Q component optical signal of X-polarization and Y-polarization, respectively, from the signal light. The photoelectric converter 53 converts the optical signal output from the optical hybrid circuit 52 into an electric signal. The ADC 54 converts the electric signal into a digital signal. The demodulator 55 demodulates the digital signal into an electric output signal. The demodulator 55 measures an indicator indicating the quality of an electric signal, such as, for example, an error vector magnitude (EVM), the number of error corrections calculated by an error correction unit, and a mutual information amount. Hereinafter, for convenience of description, measurement of an EVM and a mutual information amount is referred to as EVM measurement. The noise generator 56 generates a noise to be added to the electric signal between the ADC 54 and the demodulator 55. The noise controller 57 adjusts a noise amount of the noise generator 56 based on an EVM from the demodulator 55.

Figure 22:
FIG. 22 is an explanatory view illustrating an exemplary information storage unit according to the third embodiment.

FIG. 22 is an explanatory view illustrating an exemplary information storage unit 30A according to the third embodiment. It is assumed that the information storage unit 30A is stored in a storage 22 in an estimation device 4B. The information storage unit 30A manages path identification information 31A, a span OSNR 32A, an added noise amount 33A, an allowable OSNR 33B, and a path OSNR 34A in association therebetween in the unit of wavelength path. The path identification information 31A is information that identifies a wavelength path. The span OSNR 32A is an OSNR of each span in the wavelength path. The allowable OSNR 33B is an OSNR of an allowable wavelength path which can be determined as transmission permission. The path OSNR is a lower limit of a path OSNR in the wavelength path. The added noise amount 33A is a noise amount additionally generated in the noise generator 56.

Figure 23:
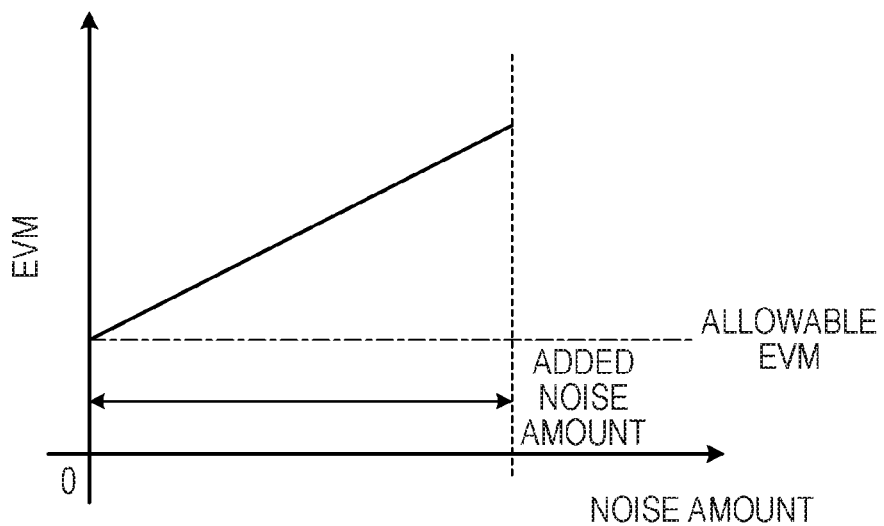
FIG. 23 is an explanatory view illustrating an exemplary relationship between an EVM and a noise amount.

FIG. 23 is an explanatory view illustrating an exemplary relationship between an EVM and a noise amount. The EVM increases with an increase in a noise amount added to the electric signal between the ADC 54 and the demodulator 55. While adding the noise, the noise controller 57 informs the control device 3 of the added noise amount at the point of time when the EVM reaches an allowable EVM, as an added noise amount of a wavelength path. The control device 3 informs the estimation device 4B of the added noise amount of the wavelength path. The allowable EVM corresponds to an EVM threshold used to determine whether or not an OSNR reaches the allowable OSNR.

Figure 24:
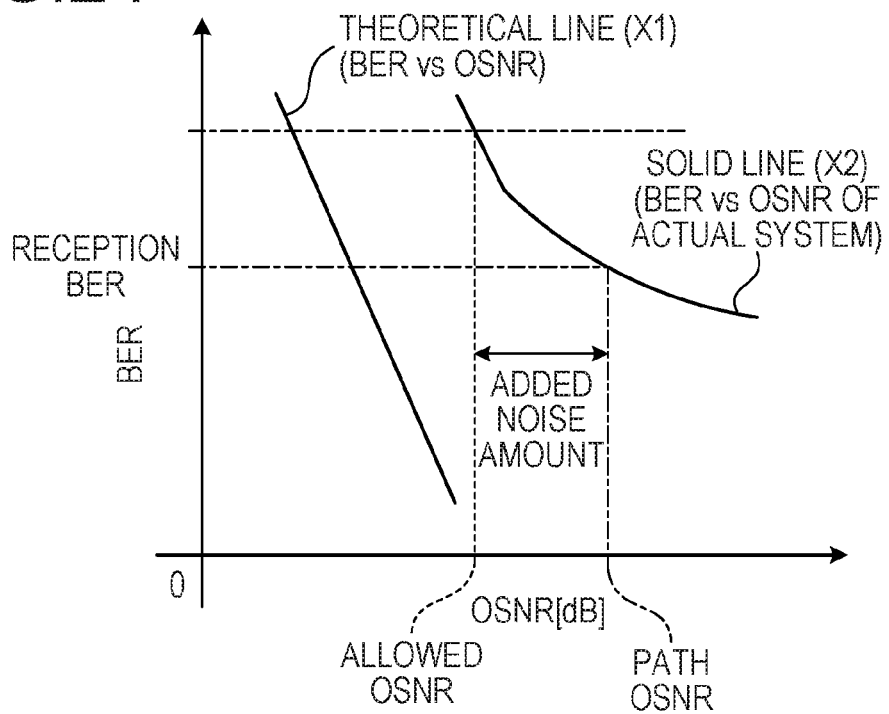
FIG. 24 is an explanatory view illustrating an exemplary relationship between an allowable OSNR, a path OSNR, and an added noise amount.

FIG. 24 is an explanatory view illustrating an exemplary relationship between an allowable OSNR associated with the allowable EVEM, a path OSNR, and an added noise amount. In FIG. 24, a theoretical line X1 indicates a theoretical BER-OSNR, and a solid line X2 indicates a BER-OSNR on an actual transmission system 1. In consideration of the imperfection of the Rx 13A and Tx 14 in the node 2 existing in the actual transmission system 1 and nonlinear noises occurring in the optical fiber 5, an OSNR is changed from the following equation (15) to the following equation (16). In the equation (16), k and h are parameters to consider the imperfection of the Rx 13A and Tx 14, and PNLI is a nonlinear noise amount. As a result, the equation (16) may be used to describe a reception BER more correctly (see E. Torrengo et al., ECOC2011, We.7.B.2, 2011)

$$\text{Path } OSNR = \frac{P_{sig}}{P_{ASE}} \quad \text{[Equation 15]}$$

$$\text{Path } OSNR' = k \frac{P_{sig}}{P_{ASE} + P_{NLI} + h} \quad \text{[Equation 16]}$$

In comparison with the theoretical line X1, the solid line X2 shifts in a direction of change in an OSNR depending on the parameters k and h and the nonlinear noise amount $P_{NLI}$ and produces an error floor in which BER is not decreased even with increase in OSNR. Since k, h, and $P_{NLI}$ vary depending on individual variations of the Rx 13A and Tx 14 and transmission system conditions, the shift amount and the error floor also vary.

The allowable OSNR is a design value determined by the performance of the Rx 13A and Tx 14 and a required margin. The added noise amount is acquired from the noise controller 57. The path OSNR, the allowable OSNR and the added noise amount have the relationship of path OSNR=allowable OSNR+added noise amount. Based on an allowable OSNR and an added noise amount of each wavelength path under operation, the first arithmetic unit 42 of the estimation device 4B may calculate a path OSNR with (allowable OSNR+added noise amount). As a result, it is possible to estimate a path OSNR with high precision in consideration of an effect of error floor due to the imperfection of the Rx 13A and Tx 14 and an effect of error floor that varies depending on the performance variations of the Rx 13A and Tx 14 and system conditions.

Figures 25, 26:
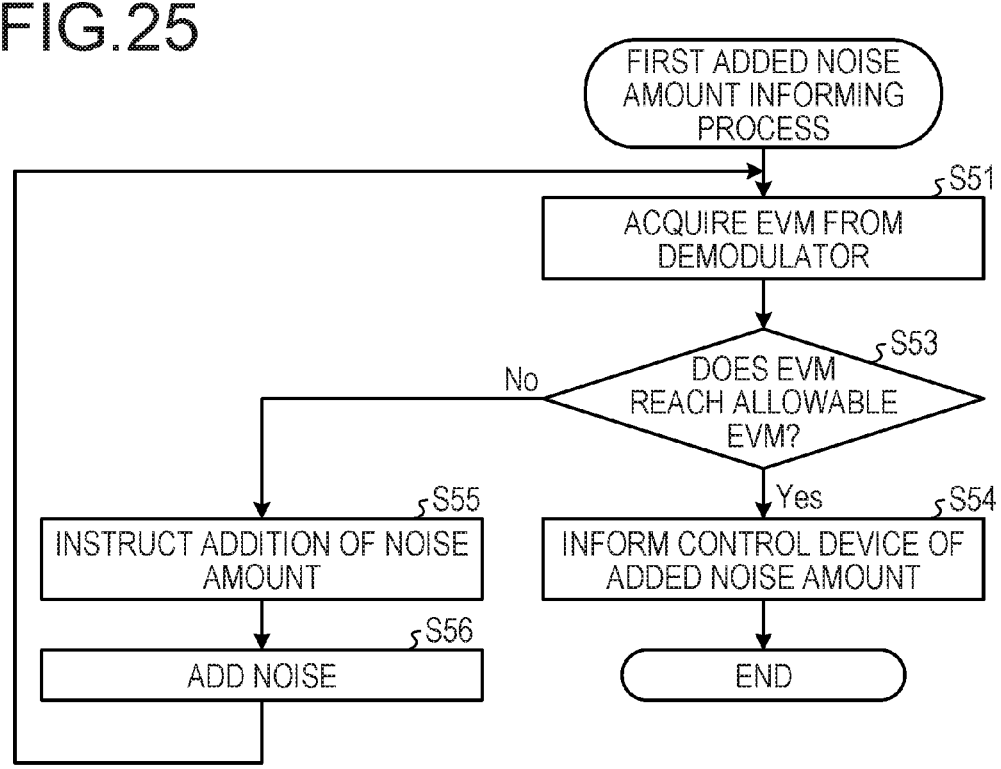
FIG. 25 is a flow chart illustrating an exemplary processing operation of Rx, which is involved in a first added noise amount informing process.
FIG. 26 is an explanatory view illustrating an exemplary information storage unit according to the third embodiment.

Next, the operation of the transmission system of the third embodiment will be described. FIG. 25 is a flow chart illustrating an exemplary processing operation of the Rx 13A, which is involved in a first added noise amount informing process of the third embodiment.

In FIG. 25, the noise controller 57 in the Rx 13A acquires an EVM from the demodulator 55 (Operation S51). The noise controller 57 determines whether or not a measured EVM reaches the allowable EVM (i.e., is lowered) (Operation S53). When it is determined that the measured EVM reaches the allowable EVM (Yes in Operation S53), the noise controller 57 informs the control device 3 of the added noise amount of the noise generator 56 (Operation S54) and ends the processing operation illustrated in FIG. 25.

When it is determined that the measured EVM does not reach the allowable EVM (No in Operation S53), the noise controller 57 informs the noise generator 56 of a control signal to instruct the added noise amount (Operation S55). As a result, the noise generator 56 adds a noise signal to the electric signal between the ADC 54 and the demodulator 55 according to the control signal (Operation S56) and proceeds to Operation S51 to acquire the EVM from the demodulator 55.

The Rx 13A adds a noise to the signal between the ADC 54 and the demodulator 55 and informs the control device 3 of the added noise amount at the point of time when a measured EVM of a wavelength path is lowered to an allowable EVM. As a result, it is possible to acquire the added noise amount as monitor information in consideration of characteristics variations of the Rx 13A and Tx 14 having EVM and noise characteristics.

The noise generator 56 adds a noise to a signal between the ADC 54 and the demodulator 55. The demodulator 55 measures an EVM of a wavelength path. The noise controller 57 informs the control device 3 of the added noise amount at the point of time when a measured EVM is lowered to an allowable EVM. The EVM is lowered with an increase in the noise added to the signal between the ADC 54 and the demodulator 55. The control device 3 informs the estimation device 4B of the added noise amount of a wavelength path. The controller 23 in the estimation device 4B stores the added noise amount of the wavelength path in the information storage unit 30A. FIG. 26 is an explanatory view illustrating an exemplary information storage unit 30A according to the third embodiment. The estimation device 4B collects the added noise amount and an allowable OSNR of each wavelength path and stores the collected added noise amount and an allowable OSNR of each wavelength path and a path OSNR in a corresponding area of the information storage unit 30A, as illustrated in FIG. 26. The path OSNR is calculated with (noise additional amount+allowable OSNR) of the wavelength path.

FIG. 27 is an explanatory view illustrating an exemplary information storage unit 30A used for operation of the first arithmetic unit 42 of the third embodiment. When calculating an OSNR of each span in a wavelength path in the information storage unit 30A, the first arithmetic unit 42 extracts a path OSNR of the wavelength path and equally divides the extracted path OSNR by the number of spans and stores it.

Figure 28A:
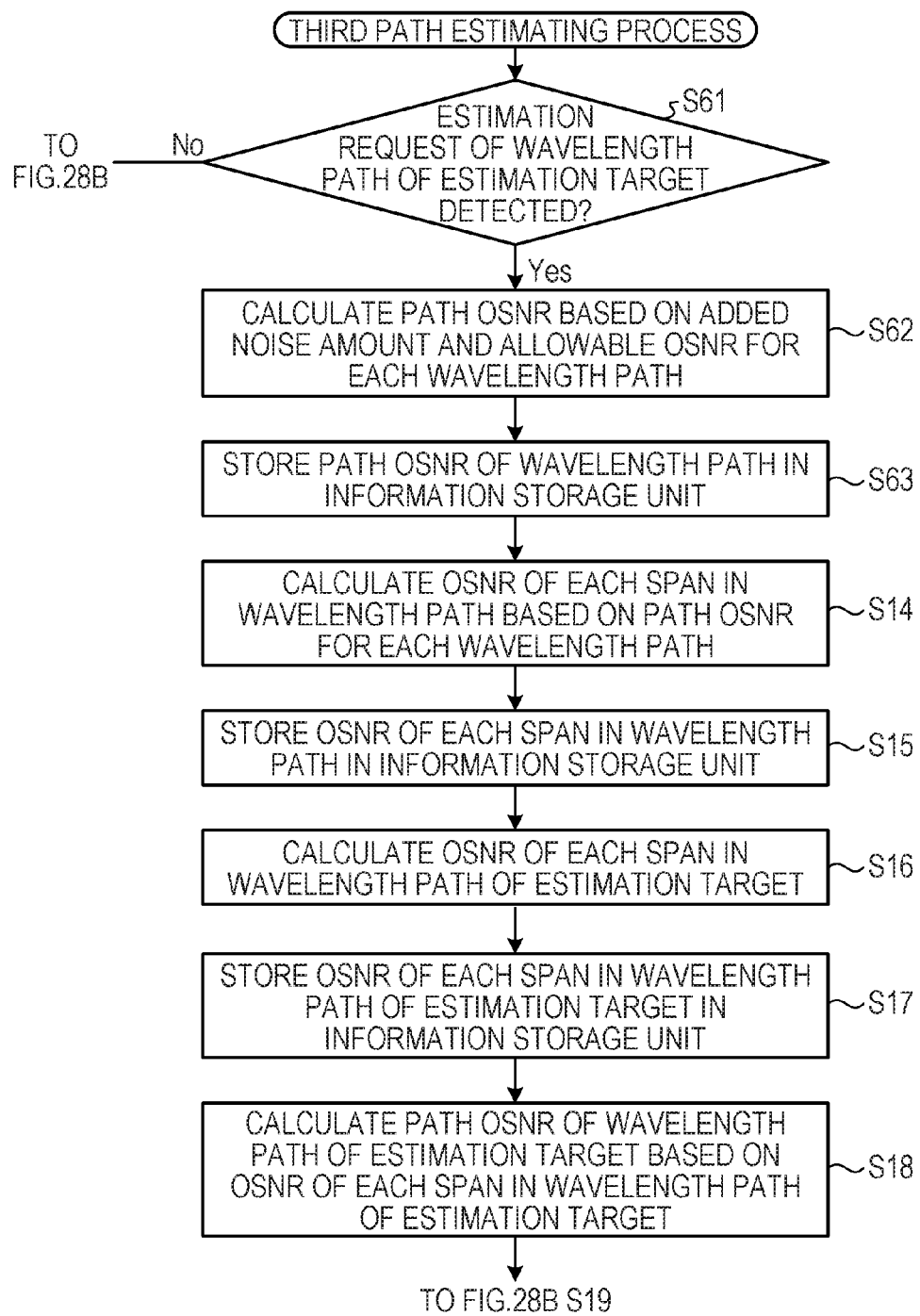
FIGS. 28A and 28B are a flow chart illustrating an exemplary processing operation of an estimation device, which is involved in a third path estimating process.
Figure 28B:
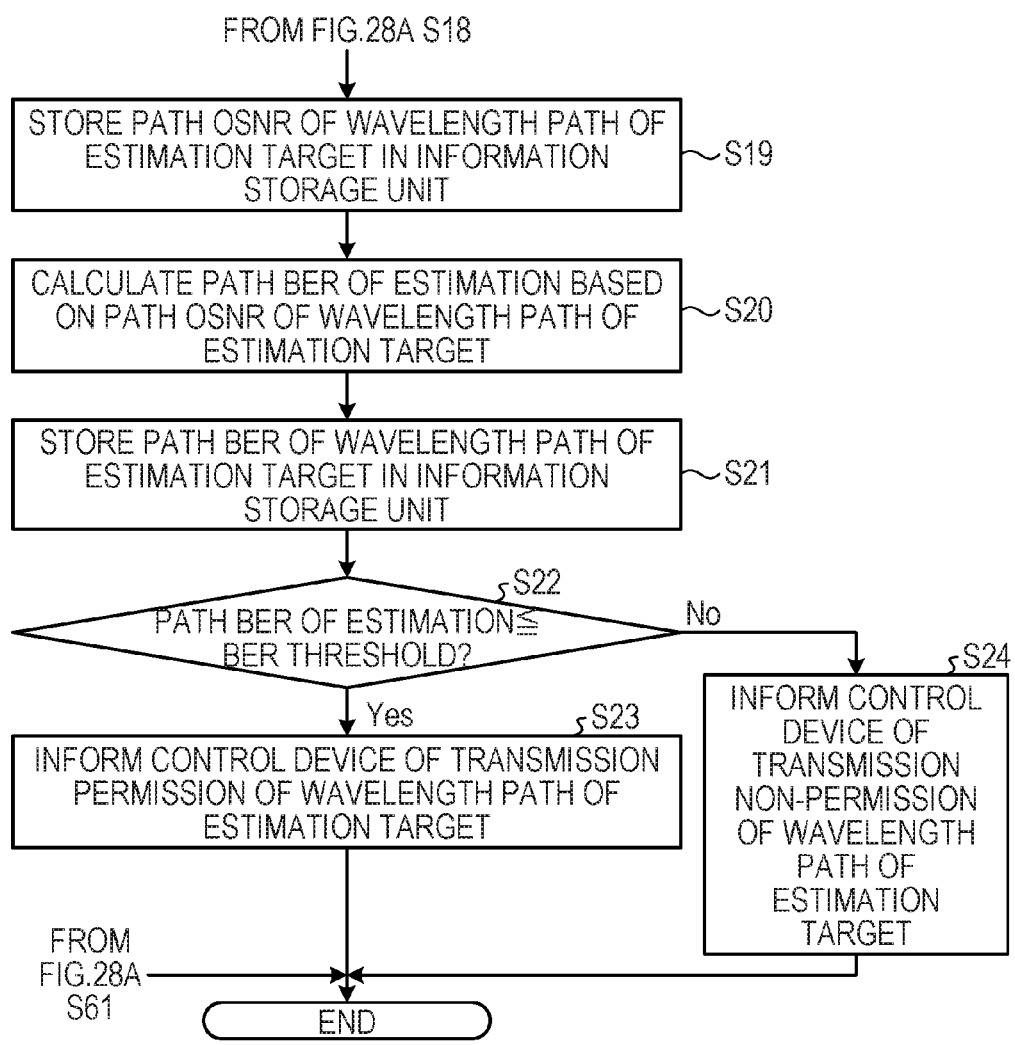

FIGS. 28A and 28B are a flow chart illustrating an exemplary a processing operation of the estimation device 4B, which is involved in a third path estimating process. The third path estimating process illustrated in FIGS. 28A and 28B is a process of calculating a path OSNR based on an added noise amount and an allowable OSNR for each wavelength path. In FIGS. 28A and 28B, the controller 23 in the estimation device 4B determines whether or not an estimation request for an estimation path has been detected (Operation S61). When it is determined that the estimation request for the estimation path has been detected (Yes in Operation S61), the controller 23 calculates a path OSNR based on the added noise amount and allowable OSNR for each wavelength path by referring to the information storage unit 30A (Operation S62).

The controller 23 stores the calculated path OSNR of the wavelength path in the information storage unit 30A (Operation S63). After storing the path OSNR of the wavelength path in the information storage unit 30A, the controller 23 performs the steps after Operation S14 illustrated in FIGS. 10A and 10B.

The Rx 13A of the third embodiment adds a noise to a signal between the ADC 54 and the demodulator 55 and informs the control device 3 of the added noise amount at the point of time when an EVM of a wavelength path is lowered to an allowable EVM. As a result, it is possible to acquire the added noise amount as monitor information in consideration of characteristics variations of the Rx 13A and Tx 14 having an EVM and noise characteristics.

The estimation device 4B adds a noise to an optical signal communicating a wavelength path and calculates an OSNR of each span in the wavelength path based on a path OSNR of the wavelength path. In addition, the estimation device 4B calculates an OSNR of each span in a wavelength path of an estimation target based on the calculated OSNR of each span in the wavelength path. In addition, the estimation device 4B calculates a path OSNR in the wavelength path of the estimation target based on the calculated OSNR of each span in the wavelength path of the estimation target and estimates a path BER of the wavelength path of the estimation target based on the calculated path OSNR. As a result, it is possible to improve the estimation precision for the path BER of the wavelength path of the estimation target in consideration of the characteristics variation of the Rx 13A and Tx 14. In addition, based on a result of the estimation, by achieving a margin distribution suitable for large capacity and long distance in the transmission system 1, it is possible to achieve removal of an extra regenerator and shorten time taken to set wavelength paths in the transmission system 1.

In the third embodiment, in order to determine whether or not an OSNR reaches the allowable OSNR, an EVM of a wavelength path is measured from the demodulator 55 of the Rx 13A, and it is determined whether or not a measured EVM reaches an allowable EVM. However, the determination on whether or not an OSNR reaches the allowable OSNR is not limited to the EVM, as will be described below as a fourth embodiment. The same configurations and operations as the transmission system 1 of the third embodiment are denoted by the same reference numerals and, therefore, explanation thereof will not be repeated.

Fourth Embodiment

Figure 29:
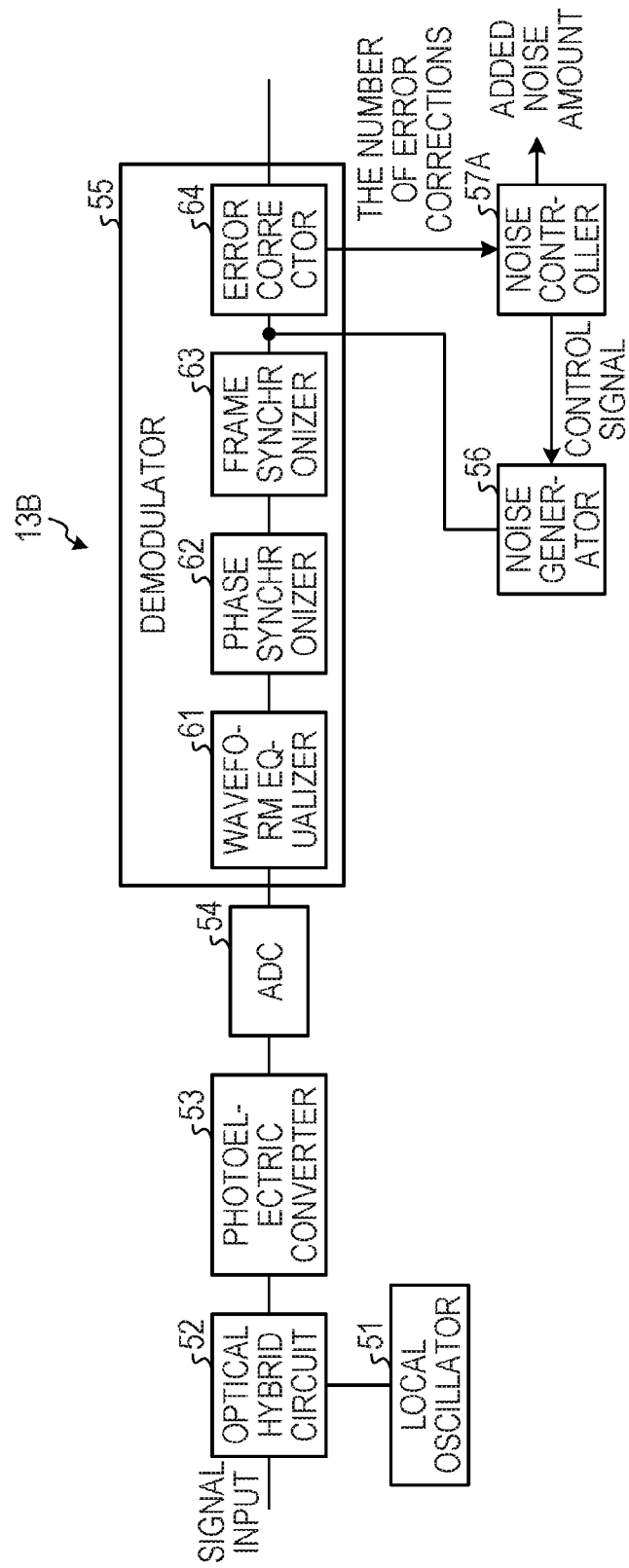
FIG. 29 is an explanatory view illustrating an exemplary Rx according to a fourth embodiment.

FIG. 29 is an explanatory view illustrating an exemplary Rx 13B according to a fourth embodiment. In FIG. 29, a demodulator of the Rx 13B includes a waveform equalizer 61, a phase synchronizer 62, a frame synchronizer 63, and an error corrector 64. The waveform equalizer 61 equalizes a signal converted into a digital signal by the ADC 54. The phase synchronizer 62 synchronizes the phase of the equalized signal. The frame synchronizer 63 synchronizes the frame of the phase-synchronized signal. The error corrector 64 corrects the frame-synchronized signal with an error code.

The noise generator 56 adds a noise to the frame-synchronized signal between the frame synchronizer 63 and error corrector 64 in the demodulator 55. The error corrector 64 calculates the number of error corrections of the noise-added signal and informs a noise controller 57A of the calculated number of error corrections. The noise controller 57A measures a BER before the error correction based on the number of error corrections. The noise controller 57A informs the control device 3 of the added noise amount at the point of time when the BER before the error correction reaches its upper threshold.

Figure 30:
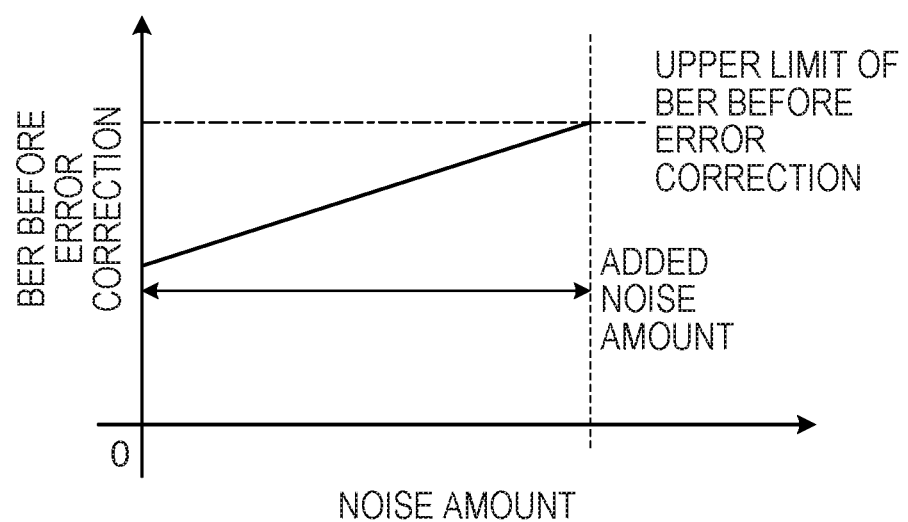
FIG. 30 is an explanatory view illustrating an exemplary relationship between a BER before an error correction and noise amount.

FIG. 30 is an explanatory view illustrating an exemplary relationship between BER before error correction and a noise amount. The BER before error correction increases with an increase in the noise added to the signal between the frame synchronizer 63 and the error corrector 64. The noise controller 57A calculates the BER before error correction based on the number of error corrections from the demodulator 55. The noise controller 57A informs the control device 3 of the added noise amount at the point of time when the BER before the error correction reaches its upper threshold, as the added noise amount of a wavelength path. The control device 3 informs an estimation device 4C of the added noise amount of the wavelength path.

Figure 31:
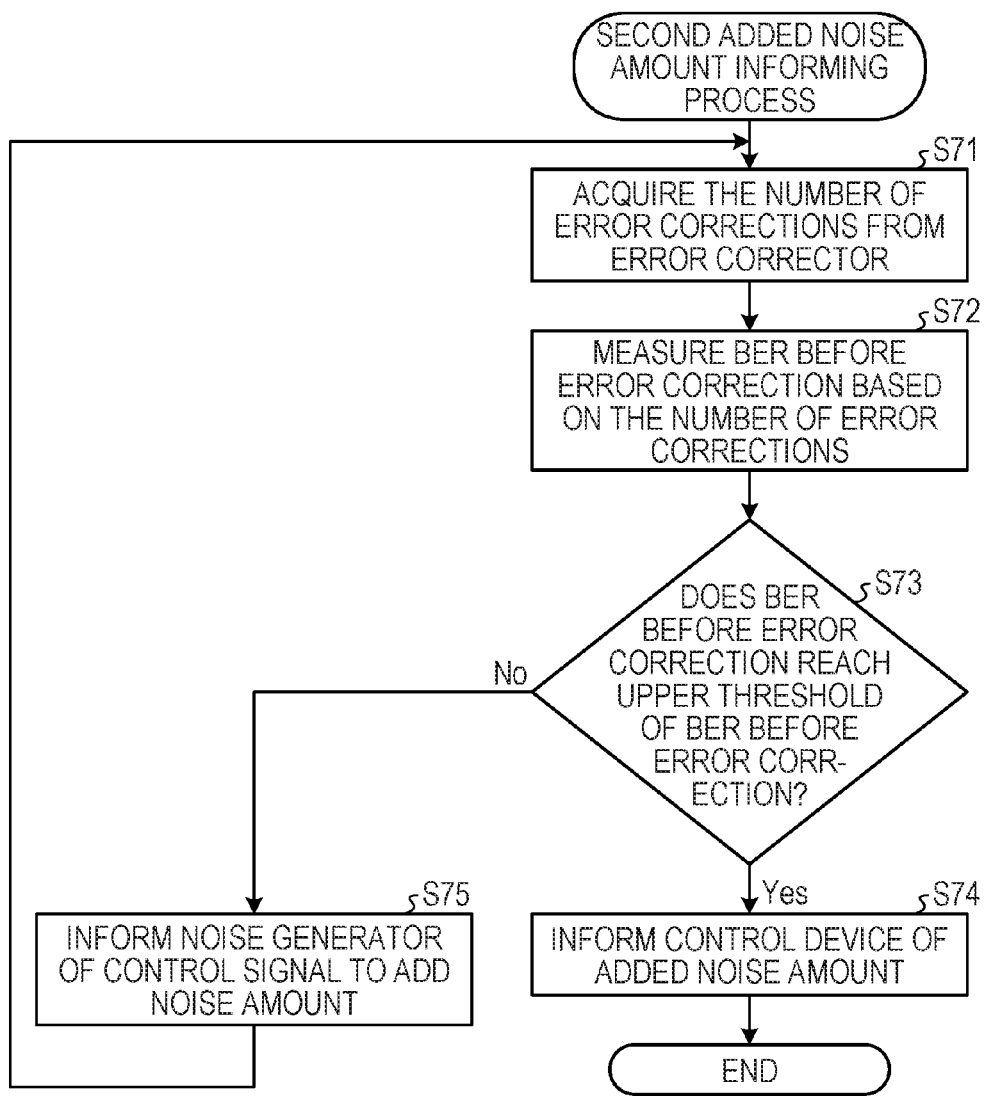
FIG. 31 is a flow chart illustrating an exemplary processing operation of an Rx, which is involved in a second added noise amount informing process.

Next, the operation of the transmission system 1 of the fourth embodiment will be described. FIG. 31 is a flow chart illustrating an exemplary processing operation of the Rx 13B, which is involved in a second added noise amount informing process. In FIG. 31, the noise controller 57A in the Rx 13B acquires the number of error corrections from the error corrector 64 in the demodulator 55 (Operation S71). The noise controller 57A measures the BER before error correction between the frame synchronizer 63 and the error corrector 64 based on the acquired number of error corrections of the wavelength path (Operation S72).

The noise controller 57A determines whether or not a BER before error correction reaches its upper threshold (Operation S73). When it is determined that the BER before error correction reaches its upper threshold (Yes in Operation S73), the noise controller 57A informs the control device 3 of the added noise amount at this point of time (Operation S74) and ends the processing operation illustrated in FIG. 31. When it is determined that the BER before error correction does not reach its upper threshold (No in Operation S73), the noise controller 57A outputs a control signal to instruct noise addition to the noise generator 56 (Operation S75) and proceeds to Operation S71 to acquire the number of error corrections.

The Rx 13B of the fourth embodiment adds a noise to a signal between the frame synchronizer 63 and the error corrector 64, measures a BER before error correction based on the number of error corrections of a wavelength path, and informs the control device 3 of the added noise amount at the point of time when the BER before error correction increases to its upper threshold. As a result, it is possible to acquire the added noise amount as monitor information in consideration of characteristics variations of the Rx 13B and Tx 14 having a BER and noise characteristics.

An estimation device 4C adds a noise to an optical signal communicating a wavelength path and calculates an OSNR of each span in the wavelength path based on a path OSNR of the wavelength path. In addition, the estimation device 4C calculates an OSNR of each span in a wavelength path of an estimation target based on the calculated OSNR of each span in the wavelength path. In addition, the estimation device 4C calculates a path OSNR in the wavelength path of the estimation target based on the calculated OSNR of each span in the wavelength path of the wavelength path of the estimation target and estimates a path BER of the wavelength path of the estimation target based on the calculated path OSNR. As a result, it is possible to improve the estimation precision for the path BER of the wavelength path of the estimation target in consideration of the characteristics variation of the Rx 13B and Tx 14.

The estimation device 4C of the fourth embodiment collects the added noise amount at the point of time when the BER before error correction of the wavelength path increases to its upper threshold, from the Rx 13B, and calculates the path OSNR based on the added noise amount. However, the calculation of the path OSNR is not limited to the added noise amount, as will be described below as a fifth embodiment.

Fifth Embodiment

Figure 32:
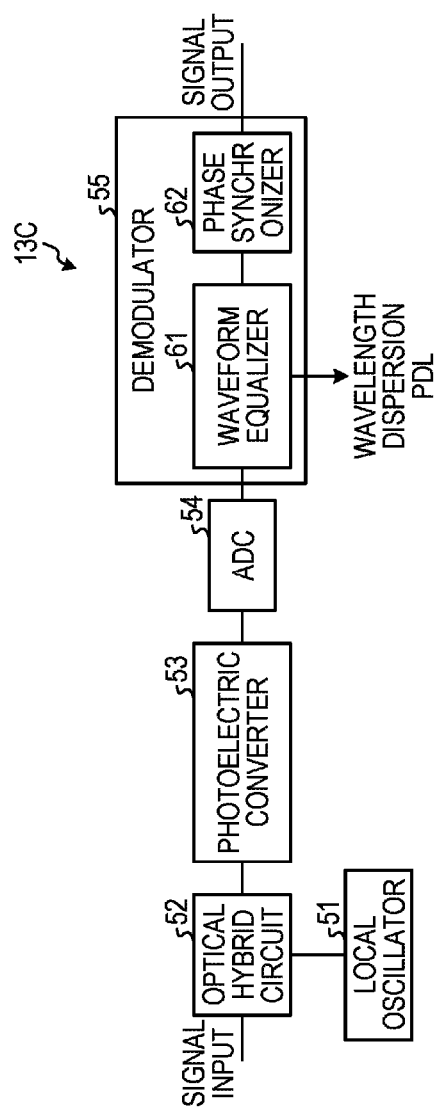
FIG. 32 is an explanatory view illustrating an exemplary Rx according to a fifth embodiment.

FIG. 32 is an explanatory view illustrating an exemplary Rx 13C according to a fifth embodiment. In FIG. 32, a demodulator 55 in the Rx 13C includes a waveform equalizer 61 and a phase synchronizer 62. The waveform equalizer 61 implements the reverse characteristics of wavelength dispersion and polarization dependent loss (PDL), which occurs when an optical signal propagates into the optical fiber 5, with a digital filter, and performs a wave equalization with filtering. The waveform equalizer 61 monitors a PDL of a receiving terminal of the optical signal. The Rx 13C informs the control device 3 of the PDL of the receiving terminal of a wavelength path. The control device 3 informs an estimation device 4D of the PDL of the receiving terminal of the wavelength path.

Figure 33:
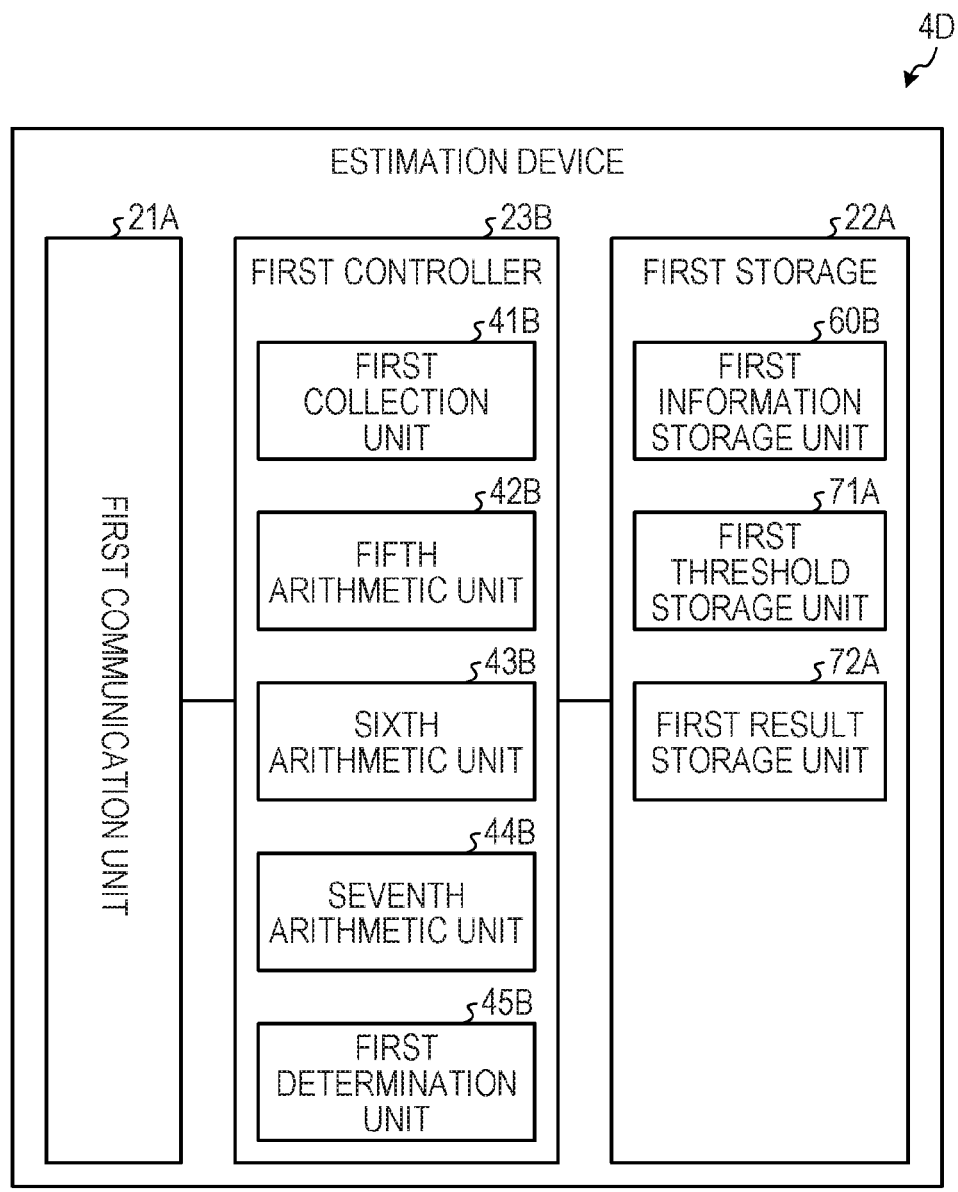
FIG. 33 is an explanatory view illustrating exemplary functional configuration of an estimation device according to the fifth embodiment.

FIG. 33 is an explanatory view illustrating an exemplary estimation device 4D of the fifth embodiment. In FIG. 33, the estimation device 4D includes a first communication unit 21A, a first storage 22A, and a first controller 23B. The first communication unit 21A is a communication interface responsible for communication with the control device 3. The first storage 22A is an area that stores a variety of information. The first controller 23B controls the overall operation of the estimation device 4D.

The first storage 22A includes a first information storage unit 60B, a first threshold storage unit 71A, and a first result storage unit 72A. FIG. 34 is an explanatory view illustrating an exemplary first information storage unit 60B. The first information storage unit 60B illustrated in FIG. 34 manages path identification information 61B, a span PDL 62B (see FIG. 35), and a receiving terminal PDL 63B in association therebetween. The span PDL 62B is a PDL of each span in a wavelength path. The receiving terminal PDL 63B is a PDL in the unit of wavelength path. The first information storage unit 60B stores the information in an order of a longer wavelength of the wavelength path.

The first threshold storage unit 71A is an area that stores a PDL threshold to be described later. The first result storage unit 72A is an area that stores a transmission result indicating whether or not a wavelength path of an estimation target can be transmitted.

The first controller 23B includes a first collection unit 41B, a fifth arithmetic unit 42B, a sixth arithmetic unit 43B, a seventh arithmetic unit 44B, and a first determination unit 45B. The first collection unit 41B collects the receiving terminal PDL 63B of wavelength paths λ1, λ2, and λ4 from the control device 3 and stores the path identification information of the wavelength paths λ1, λ2, and λ4 and the receiving terminal PDL 63B of the wavelength paths in the first information storage unit 60B.

FIG. 35 is an explanatory view illustrating one example (PDL) of the first information storage unit 60B used for operation of the fifth arithmetic unit 42B. The fifth arithmetic unit 42B calculates a PDL of each span in a wavelength path based on the receiving terminal PDL 63B of the wavelength path according to the following equations (17) and (18), and sequentially stores the PDL of each span in the wavelength path for the path identification information of the wavelength path in the first information storage unit 60B. The receiving terminal PDL is a value approximate to an averaged $PDL_{mean}$ obtained by statistical addition.

$$PDL_{RX} \approx PDL_{mean} \qquad \text{[Equation 17]}$$

$$PDL_{mean} = \left( \sum_i PDL_i^2 \right)^{1/2} \qquad \text{[Equation 18]}$$

Where, $PDL_i$ is a PDL in a span i.

The sixth arithmetic unit 43B calculates a PDL of each span in a wavelength path of an estimation target based on a PDL of each span in an existing wavelength path in the first information storage unit 60B. The sixth arithmetic unit 43B calculates the PDL of each span in the wavelength path λ3 of the estimation target based on a PDL of each span in a different wavelength path stored in the first information storage unit 60B, and stores the calculated PDL in a corresponding area of the wavelength path λ3 in the first information storage unit 60B.

For example, the sixth arithmetic unit 43B calculates a PDL of the span A-B of the wavelength path λ3 of the estimation target based on a PDL of the same span A-B of the wavelength path λ1. In this case, since the number of PDLs of the same span as the span A-B of the wavelength path λ3 in the first information storage unit 60B is one, the sixth arithmetic unit 43B assigns the PDL of the span A-B of the wavelength path λ1 to the PDL of the same span A-B of the wavelength path λ3. Then, the sixth arithmetic unit 43B stores the assigned PDL of the span A-B in an area of the same span A-B of the wavelength path λ3 in the first information storage unit 60B.

In addition, the sixth arithmetic unit 43B calculates a PDL of the span B-C of the wavelength path λ3 based on a PDL of the same span B-C of the wavelength paths λ1 and λ2. In this case, the sixth arithmetic unit 43B determines that the number of PDLs of the same span as the span B-C in the wavelength path λ3 in the first information storage unit 60B is two, i.e., plural, and a wavelength of the wavelength path λ3 does not exist between the wavelength paths λ1 and λ2. Accordingly, the sixth arithmetic unit 43B calculates a PDL of the same span of the wavelength path λ3 in a linear extrapolation of a PDL of the span B-C of the wavelength paths λ1 and λ2. Then, the sixth arithmetic unit 43B stores the calculated PDL of the span B-C in an area of the span B-C of the wavelength path λ3 in the first information storage unit 60B.

In addition, since the number of PDLs of the same span as the span C-D of the wavelength path λ3 in the first information storage unit 60B is one, the sixth arithmetic unit 43B assigns the PDL of the span C-D of the wavelength path λ2 to the PDL of the same span A-B of the wavelength path λ3. Then, the sixth arithmetic unit 43B stores the assigned PDL of the span C-D in an area of the same span C-D of the wavelength path λ3 in the first information storage unit 60B.

In addition, the sixth arithmetic unit 43B calculates a PDL of the span D-E of the wavelength path λ3 based on a PDL of the same span D-E of the wavelength paths λ2 and λ4. In this case, the sixth arithmetic unit 43B determines that the number of PDLs of the same span as the span D-E in the wavelength path λ3 in the first information storage unit 60B is two, i.e., plural, and a wavelength of the wavelength path λ3 exists between the wavelength paths λ2 and λ4. Accordingly, the sixth arithmetic unit 43B calculates a PDL of the same span of the wavelength path λ3 in a linear interpolation of PDL of the span D-E of the wavelength paths λ2 and λ4. Then, the sixth arithmetic unit 43B stores the calculated PDL of the span D-E in an area of the span D-E of the wavelength path λ3 in the first information storage unit 60B.

In addition, since the number of PDLs of the same span as the span E-F of the wavelength path λ3 in the first information storage unit 60B is one, the sixth arithmetic unit 43B determines the PDL of the span E-F of the wavelength path λ4 as the PDL of the same span of the wavelength path λ3. Then, the sixth arithmetic unit 43B stores the determined PDL of the span E-F in an area of the same span E-F of the wavelength path λ3 in the first information storage unit 60B.

In addition, since the number of PDLs of the same span as the span F-G of the wavelength path λ3 in the first information storage unit 60B is one, the sixth arithmetic unit 43B assigns the PDL of the span F-G of the wavelength path λ4 to the PDL of the same span of the wavelength path λ3. Then, the sixth arithmetic unit 43B stores the assigned PDL of the span F-G in an area of the same span F-G of the wavelength path λ3 in the first information storage unit 60B.

Then, the sixth arithmetic unit 43B calculates a receiving terminal PDL based on the PDL of each span in the wavelength path λ3 of the estimation target in the first information storage unit 60B, and stores the calculated receiving terminal PDL in the first information storage unit 60B.

Then, the seventh arithmetic unit 44B calculates a receiving terminal PDL of estimation of the wavelength path λ3 of the estimation target based on the PDL of the wavelength path λ3 of the estimation target stored in the first information storage unit 60B, and stores the calculated receiving terminal PDL in the first information storage unit 60B.

In addition, the first determination unit 45B determines whether or not the receiving terminal PDL of the wavelength path λ3 of the estimation target calculated in the seventh arithmetic unit 44B is equal to or less than a PDL threshold stored in the first threshold storage unit 71A. When the receiving terminal PDL of estimation of the wavelength path λ3 of the estimation target is equal to or less than the PDL threshold, the first determination unit 45B determines that the wavelength path λ3 of the estimation target can be transmitted, and stores a result of the determination in the first result storage unit 72A.

When the receiving terminal PDL of estimation of the wavelength path λ3 of the estimation target is not equal to or less than the PDL threshold, the first determination unit 45B determines that the wavelength path λ3 of the estimation target cannot be transmitted, and stores a result of the determination in the first result storage unit 72A. Then, the first communication unit 21A informs the control device 3 of the determination result of the first result storage unit 72A.

Figure 36:
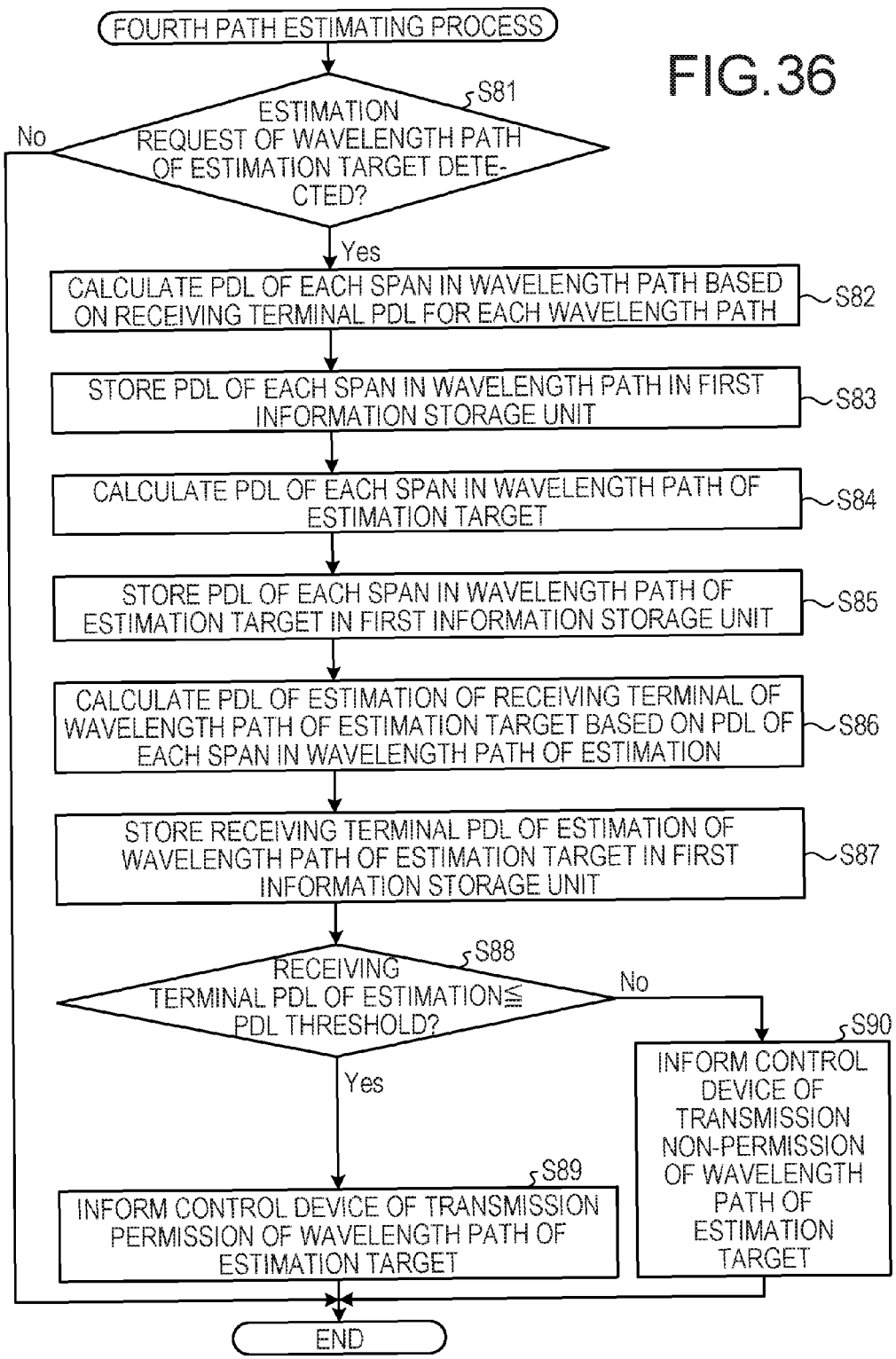
FIG. 36 is a flow chart illustrating an exemplary processing operation of an estimation device, which is involved in a fourth path estimating process.

Next, the operation of the transmission system 1 of the fifth embodiment will be described. FIG. 36 is a flow chart illustrating an exemplary processing operation of the estimation device 4D, which is involved in a fourth path estimating process.

In FIG. 36, the first controller 23B in the estimation device 4D determines whether or not an estimation request for a wavelength path has been detected from the control device 3 (Operation S81). When it is determined that the estimation request for the wavelength path has been detected (Yes in Operation S81), the fifth arithmetic unit 42B in the first controller 23B calculates a PDL for each wavelength path based on a receiving terminal PDL for each wavelength path in the first information storage unit 60B (Operation S82). Then, the fifth arithmetic unit 42B stores the calculated PDL for each wavelength path in the first information storage unit 60B (Operation S83).

In addition, based on a PDL for each wavelength path in the first information storage unit 60B, the sixth arithmetic unit 43B calculates a PDL of each span in the wavelength path of the estimation target (Operation S84). The sixth arithmetic unit 43B stores the calculated PDL of each span in the wavelength path of the estimation target in an area of each span for each wavelength path in the first information storage unit 60B (Operation S85).

Based on a PDL for each wavelength path in the first information storage unit 60B, the sixth arithmetic unit 43B calculates a receiving terminal PDL of each span in the wavelength path of the estimation target (Operation S86). The sixth arithmetic unit 43B stores the calculated receiving terminal PDL of estimation in the wavelength path of the estimation target in the first information storage unit 60B (Operation S87).

The first determination unit 45B determines whether or not the receiving terminal PDL of estimation of the wavelength path of the estimation target is equal to or less than the PDL threshold (Operation S88). When it is determined that the receiving terminal PDL of estimation of the wavelength path of the estimation target is equal to or less than the PDL threshold (Yes in Operation S88), the first determination unit 45B determines that the wavelength path of the estimation target can be transmitted, informs the control device 3 of transmission permission (Operation S89), and ends the processing operation illustrated in FIG. 36.

When it is determined that the receiving terminal PDL of estimation of the wavelength path of the estimation target is not equal to or less than the PDL threshold (No in Operation S88), the first determination unit 45B determines that the wavelength path of the estimation target cannot be transmitted, informs the control device 3 of transmission non-permission (Operation S90), and ends the processing operation illustrated in FIG. 36.

In addition, when it is determined that the estimation request for the estimation path has not been detected (No in Operation S81), the first controller 23B ends the processing operation illustrated in FIG. 36. In addition, although it has been illustrated in the fifth embodiment that a receiving terminal PDL of a wavelength path is used to estimate a receiving terminal of a wavelength path of an estimation target, a polarization mode dispersion (PMD) may be used.

The estimation device 4D of the fifth embodiment calculates a PDL of each span in a wavelength path based on a receiving terminal PDL of each wavelength path. In addition, the estimation device 4D calculates a PDL of each span in a wavelength path of an estimation target based on a PDL of the same span of a different wavelength path. In addition, the estimation device 4C calculates a receiving terminal PDL in a wavelength path of an estimation target based on a PDL of each span in the wavelength path of the estimation target. As a result, the estimation device 4D may estimate a receiving terminal PDL in a wavelength path of an estimation target.

When the receiving terminal PDL of estimation of the wavelength path of the estimation target is equal to or less than the PDL threshold, the estimation device 4D informs the control device 3 of transmission permission of the wavelength path of the estimation target. As a result, the control device 3 may recognize the transmission permission of the wavelength path of the estimation target.

When the receiving terminal PDL of estimation of the wavelength path of the estimation target is not equal to or less than the PDL threshold, the estimation device 4D informs the control device 3 of transmission non-permission of the wavelength path of the estimation target. As a result, the control device 3 may recognize the transmission non-permission of the wavelength path of the estimation target.

Figure 37:
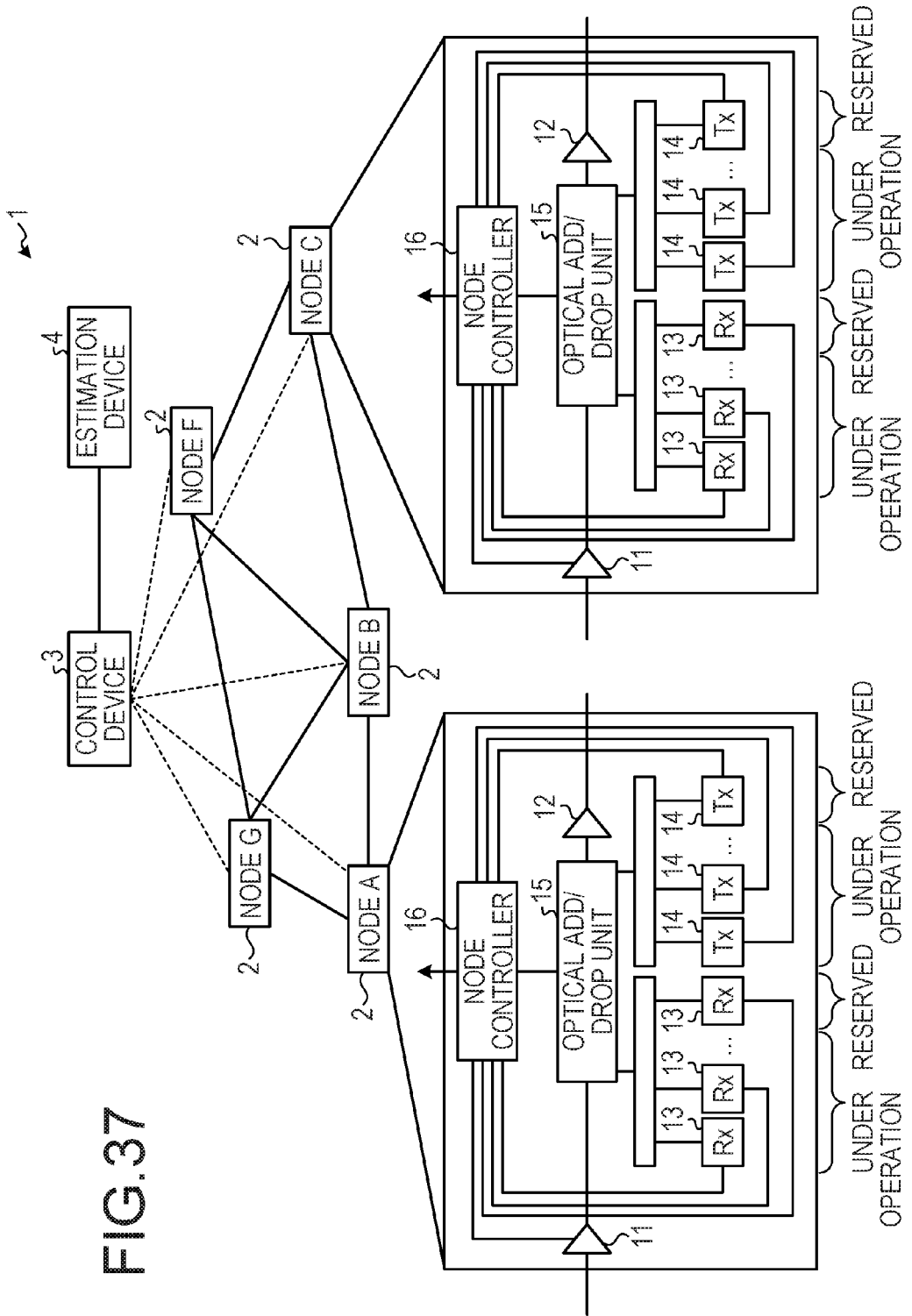
FIG. 37 is an explanatory view illustrating an exemplary use of a transmission system.

FIG. 37 is an explanatory view illustrating an exemplary use of a transmission system 1. The same configurations and operations as the transmission system 1 of the first embodiment are denoted by the same reference numerals and, therefore, explanation thereof will not be repeated. Each node 2 illustrated in FIG. 37 contains a plurality of Rxs 13 and a plurality of Txs 14. The node A measures a path BER of a wavelength path between the node A and a node C via a node B. The nodes A and B transmit a signal with a wavelength path using Rx 13 and Tx under operation, leaving reserved Rx 13 and Tx 14, among the plurality of Rxs 13 and Txs 14. It may be assumed that the control device 3 informs the estimation device 4 of a command to request estimation of a path BER of a wavelength path of an estimation target using the reserved Rx 13 and Tx 14 while operating a wavelength path using the Rx 13 and Tx 14.

The estimation device 4 calculates a path OSNR in a wavelength path under operation based on a path BER in the wavelength path under operation, which is stored in the information storage unit 30. In addition, the estimation device 4 calculates an OSNR of each span in a wavelength path based on an OSNR in the wavelength path under operation. The estimation device 4 calculates an OSNR of each span in a wavelength path of a reserved estimation target based on an OSNR of each span in the wavelength path and calculates a path OSNR based on an OSNR of each span in the wavelength path of the estimation target. Then, the estimation device 4 calculates a path BER of the wavelength path of the reserved estimation target based on the calculated path OSNR.

That is, the estimation device 4 may estimate a path BER of a specified reserved wavelength path among a plurality of reserved wavelength paths, without stopping the operation of a wavelength path under operation.

The first arithmetic unit 42 of the first embodiment calculates a path OSNR of a wavelength path from a BER of the existing wavelength path and calculates an OSNR of each span in a wavelength path based on the calculated path OSNR. However, the first arithmetic unit 42 may measure and manage a path OSNR of the existing wavelength path and calculate an OSNR of each span in a wavelength path from the measured path OSNR.

Each of the components of the parts illustrated is not necessarily required to be configured physically as illustrated. That is, the specific forms of distribution and integration of the components are not limited to those illustrated in the drawings, and some or all of the components may be functionally or physically distributed or integrated in any units depending on various loads and use situations.

Further, some or all of the various processes, which are performed in respective devices, may be implemented on a central processing unit (CPU) (or a microcomputer such as, for example, a micro processing unit (MPU) and a micro controller unit (MCU)). In addition, some or all of the various processes may be implemented on a program to perform analysis and execution by a CPU (or a microcomputer (e.g., an MPU or an MCU)) or on hardware by a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A network controller comprising:
a memory; and
a processor coupled to the memory and configured to:
acquire, based on a signal quality amount of each of a set of wavelength paths in a network of an optical wavelength-multiplexed transmission system, a signal quality amount of each of spans in each of the wavelength paths;
calculate a signal quality amount of each of spans in a wavelength path of an estimation target, based on the acquired signal quality amount;
estimate a signal quality amount of the wavelength path of the estimation target, based on the calculated signal quality amount;
acquire, when the signal quality amount of the wavelength path of the estimation target is estimated, the signal quality amount of the wavelength path of the estimation target after transmitting of the optical signal on the wavelength path of the estimation target; and
update the signal quality amount of each of the spans in the wavelength path of the estimation target before transmitting of the optical signal on the wavelength path of the estimation target, based on the signal quality amount of the wavelength path of the estimation target after transmitting of the optical signal on the wavelength path of the estimation target.

2. The network controller according to claim 1, wherein the processor is further configured to:
determine whether or not the signal quality amount of the wavelength path of the estimation target exceeds a predetermined threshold; and
determine whether or not an optical signal is transmitted on the wavelength path of the estimation target based on whether or not the signal quality amount of the wavelength path of the estimation target exceeds the predetermined threshold.

3. The network controller according to claim 2, wherein the processor is further configured to:
acquire, when the signal quality amount of the wavelength path of the estimation target is estimated, the signal quality amount of each of the wavelength paths set in the network after transmitting of the optical signal on the wavelength path of the estimation target; and
update the signal quality amount of each of the spans in each of the wavelength paths set in the network before transmitting of the optical signal, based on the signal quality amount of each of the wavelength paths set in the network after transmitting of the optical signal on the wavelength path of the estimation target.

4. The network controller according to claim 1, wherein the processor is further configured to calculate the signal quality amount of each of the spans in the wavelength path of the estimation target, based on a signal quality amount of the same span as a span in the wavelength paths set in the network among spans in the wavelength path of the estimation target.

5. The network controller according to claim 4, wherein the processor is further configured to calculate the signal quality amount of each of the spans in the wavelength path of the estimation target, based on a calculated signal quality amount of a span in the wavelength path of the estimation target, when there is no signal quality amount of the same span as a span in the wavelength paths set in the network among spans in the wavelength path of the estimation target.

6. The network controller according to claim 1, wherein the processor is further configured to calculate the signal quality amount of each of the spans in the wavelength path of the estimation target, based on the acquired signal quality amount of each of spans in the wavelength paths set in the network, and transmission conditions of each of the spans in the wavelength path of the estimation target.

7. The network controller according to claim 1, wherein the signal quality amount is an optical signal to noise ratio.

8. A network controller comprising:
a memory; and
a processor coupled to the memory and configured to:
acquire, based on a signal quality amount of each of a set of wavelength paths in a network of an optical wavelength-multiplexed transmission system, a signal quality amount of each of spans in each of the wavelength paths;
calculate a signal quality amount of each of spans in a wavelength path of an estimation target, based on the acquired signal quality amount; and
estimate a signal quality amount of the wavelength path of the estimation target, based on the calculated signal quality amount,
wherein the signal quality amount is a sum of an added noise amount and an allowable OSNR at a point of time when a BER before error correction of the wavelength path reaches a predetermined threshold by adding a noise to a reception signal of a receiver of a communication device using the wavelength path.

9. The network controller according to claim 1,
wherein the signal quality amount is one amount of a polarization dependent loss and a polarization mode dispersion of the wavelength path.

10. A signal quality estimating method executed by a network controller including a memory and a processor coupled to the memory, the signal quality estimating method comprising:
acquiring, by the processor, based on a signal quality amount of each of a set of wavelength paths in a network of an optical wavelength-multiplexed transmission system, a signal quality amount of each of spans in each of wavelength paths;
calculating, by the processor, a signal quality amount of each of spans in a wavelength path of an estimation target based on the acquired signal quality amount;
estimating, by the processor, a signal quality amount of the wavelength path of the estimation target, based on the calculated signal quality amount;
acquiring, when the signal quality amount of the wavelength path of the estimation target is estimated, the signal quality amount of the wavelength path of the estimation target after transmitting of the optical signal on the wavelength path of the estimation target; and
updating the signal quality amount of each of the spans in the wavelength path of the estimation target before transmitting of the optical signal on the wavelength path of the estimation target, based on the signal quality amount of the wavelength path of the estimation target after transmitting of the optical signal on the wavelength path of the estimation target.

\* \* \* \* \*